United States Patent
Rho et al.

(10) Patent No.: US 11,609,405 B2
(45) Date of Patent: Mar. 21, 2023

(54) CAMERA MODULE AND ELECTRONIC DEVICE INCLUDING THE SAME

(71) Applicant: Samsung Electronics Co., Ltd., Gyeonggi-do (KR)

(72) Inventors: Hyungjin Rho, Gyeonggi-do (KR); Yeonhak Kim, Gyeonggi-do (KR); Chanyoung Moon, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/144,224

(22) Filed: Jan. 8, 2021

(65) Prior Publication Data
US 2021/0215903 A1 Jul. 15, 2021

(30) Foreign Application Priority Data
Jan. 10, 2020 (KR) .................. 10-2020-0003935

(51) Int. Cl.
| | | |
|---|---|---|
| G02B 7/09 | (2021.01) | |
| G02B 27/64 | (2006.01) | |
| G03B 5/00 | (2021.01) | |
| G03B 13/36 | (2021.01) | |
| G03B 30/00 | (2021.01) | |

(Continued)

(52) U.S. Cl.
CPC ............. *G02B 7/09* (2013.01); *G02B 27/646* (2013.01); *G03B 5/00* (2013.01); *G03B 13/36* (2013.01);

(Continued)

(58) Field of Classification Search
CPC .......... G02B 7/09; G02B 27/646; G02B 7/08; G03B 30/00; G03B 5/00; G03B 13/36;
(Continued)

(56) References Cited

U.S. PATENT DOCUMENTS

| 8,224,169 B2 | 7/2012 | Tsuruta et al. |
|---|---|---|
| 8,238,736 B2 | 8/2012 | Tsuruta et al. |

(Continued)

FOREIGN PATENT DOCUMENTS

| JP | 2007-041455 A | 2/2007 |
|---|---|---|
| JP | 5140573 B2 | 11/2012 |
| KR | 10-2017-0018136 A | 2/2017 |

OTHER PUBLICATIONS

International Search Report dated Apr. 19, 2021.
European Search Report dated Dec. 14, 2022.

*Primary Examiner* — Antoinette T Spinks
(74) *Attorney, Agent, or Firm* — Cha & Reiter, LLC

(57) ABSTRACT

An electronic device is disclosed. The electronic device may include a housing and a camera module, a first camera housing enclosing a camera assembly, the camera assembly including a second camera housing enclosing a lens carrier having at least one lens, and an image sensor. The second camera housing includes a first surface, a second surface, at least one side area surrounding a space defined between the first and second surface, and at least one corner area. The camera assembly is rotatable about the camera assembly, so that an optical axis of the lens is angled at a predetermined angle with respect to the first direction. The side area is spaced by a first gap from an inner surface of the second camera housing, and the at least one corner area is spaced by a second gap from the inner surface of the second camera housing.

19 Claims, 21 Drawing Sheets

(51) Int. Cl.
*H04N 5/225* (2006.01)
*H04N 5/232* (2006.01)

(52) U.S. Cl.
CPC ............ *G03B 30/00* (2021.01); *H04N 5/2252* (2013.01); *H04N 5/2254* (2013.01); *H04N 5/23212* (2013.01); *H04N 5/23287* (2013.01); *G03B 2205/0007* (2013.01); *G03B 2205/0069* (2013.01)

(58) Field of Classification Search
CPC .... G03B 2205/0007; G03B 2205/0069; G03B 2205/0023; H04N 5/2252; H04N 5/2254; H04N 5/23212; H04N 5/23287; H04N 5/2259
See application file for complete search history.

(56) References Cited

U.S. PATENT DOCUMENTS

| | | |
|---|---|---|
| 8,903,230 B2 | 12/2014 | Shikama et al. |
| 9,332,188 B2 | 5/2016 | Takei et al. |
| 9,601,968 B2 | 3/2017 | Song et al. |
| 9,933,629 B2 | 4/2018 | Minamisawa |
| 10,305,359 B2 | 5/2019 | Song et al. |
| 10,356,292 B2 | 7/2019 | Minamisawa et al. |
| 10,649,226 B2 | 5/2020 | Minamisawa et al. |
| 10,747,013 B2 | 8/2020 | Lim |
| 2010/0188516 A1* | 7/2010 | Kaneko .............. H04N 5/23287 348/208.4 |
| 2011/0097062 A1 | 4/2011 | Tsuruta et al. |
| 2013/0121672 A1 | 5/2013 | Shikama et al. |
| 2014/0139693 A1 | 5/2014 | Takei et al. |
| 2015/0370033 A1 | 12/2015 | Song et al. |
| 2016/0124242 A1 | 5/2016 | Minamisawa et al. |
| 2017/0038600 A1 | 2/2017 | Hee et al. |
| 2017/0139225 A1 | 5/2017 | Lim |
| 2017/0141669 A1 | 5/2017 | Song et al. |
| 2018/0017752 A1* | 1/2018 | Wei ........................ H04N 5/232 |
| 2018/0129065 A1 | 5/2018 | Minamisawa et al. |
| 2019/0020799 A1 | 1/2019 | Minamisawa et al. |
| 2020/0341291 A1 | 10/2020 | Lim |

* cited by examiner

CAMERA MODULE AND ELECTRONIC DEVICE INCLUDING THE SAME

CROSS-REFERENCE TO RELATED APPLICATION(S)

This application claims the benefit under 35 U.S.C. § 119(a) of a Korean patent application filed on Jan. 10, 2020 in the Korean Intellectual Property Office and assigned Serial number 10-2020-0003935, the entire disclosure of which is hereby incorporated by reference.

TECHNICAL FIELD

The present disclosure relates to a camera module and an electronic device including the same.

BACKGROUND

An electronic device may include one or more camera modules. The camera module may have an auto focusing function by which a lens moves along an optical axis in order to provide auto focusing of the lens. The electronic device may include an image stabilization function for stabilizing an image by compensating for shaking and vibrations of the camera module. For example, if external vibration is applied to the camera module or the electronic device, the lens of the camera module moves along an axis different than the optical axis, and thus, the electronic device may acquire a more stable and sharp image, having compensated for the vibration.

SUMMARY

A camera module and an electronic device including the same may support various functions. For example, the electronic device may control the camera module so that the camera module performs an image stabilization function or an auto focusing function. For example, the electronic device may perform the image stabilization function by moving the lens of the camera module. Regarding the image stabilization, if the lens of the camera module moves, relative positions of an image sensor and the lens may be changed, and thus quality of the acquired image may deteriorate.

Accordingly, an aspect of the present disclosure is to provide an electronic device including a camera module having an auto focusing function by which a lens moves along an optical axis, and a function by which the lens rotates and moves about at least two axes together with the image sensor.

In accordance with an aspect of the present disclosure, an electronic device is provided. The electronic device includes: a housing including a camera area facing a first direction, a camera module disposed inside the housing in order to receive light through the camera area, a first camera housing, a camera assembly disposed inside the first camera housing, the camera assembly including a second camera housing, a lens carrier having at least one lens at least partially disposed inside the second camera housing, and an image sensor disposed inside the second camera housing, wherein the second camera housing includes a first surface, a second surface facing the first surface, at least one side area surrounding a space defined between the first surface and the second surface, and at least one corner area having a surface of a predetermined surface area, wherein the camera assembly is rotatable about a rotation center point of the camera assembly, so that an optical axis of the lens is angled at a predetermined angle with respect to the first direction, and wherein the at least one side area is spaced by a first gap from an inner surface of the second camera housing facing the at least one side area, and the at least one corner area is spaced by a second gap greater than the first gap from the inner surface of the second camera housing.

In accordance with another aspect of the present disclosure, a portable communication device is provided. The portable communication device includes: a camera assembly including a first camera housing, a lens visible through a surface of the first camera housing, and an image sensor disposed within the first camera housing, a second camera housing, in which at least a portion of the camera assembly is disposed, wherein the camera assembly is coupled to an interior of the second camera housing and rotatable about a first rotation shaft disposed substantially perpendicular to a direction of an optical axis of the lens, and about a second rotation shaft substantially perpendicular to the optical axis of the lens and the first rotation shaft, wherein the first camera housing includes first side surfaces facing a first direction in which the first rotation shaft extends, second side surfaces facing a second direction that in which the second rotation shaft extends, and a corner area formed between the first side surfaces and the second side surfaces and facing a third direction different from the first direction and the second direction, wherein the corner area includes first corners defined together with the first side surfaces and second corners defined together with the second side surfaces, wherein the first side surface extending in the second direction defines a first virtual side surface, the second side surface extending in the first direction defines a second virtual side surface, and a meeting of the first virtual side surface and the second virtual side surface defines virtual corners, wherein any one of the virtual corners is spaced by a first distance away from any other of the virtual corners disposed in the second direction, by a second distance away from any other of the virtual corners disposed in the first direction, wherein each of the first corners is spaced by a first gap away from the one of the virtual corners in the second direction, wherein the second corner is spaced by a second gap away from the one of the virtual corner in the first direction, wherein at least one of a ratio of the first gap to the first distance and a ratio of the second gap to the second distance ranges from 0.1 to 0.5.

In accordance with another aspect of the present disclosure, a camera module is provided. The camera module includes: a camera assembly including a lens and an image sensor, a camera housing in which at least a portion of the camera assembly is disposed, a printed circuit board (PCB) surrounding at least a portion of the camera assembly, a plurality of coils electrically connected to the PCB, wherein the plurality of coils include a first coil disposed on a first area of the PCB, a second coil disposed on a second area of the PCB, and a third coil disposed on a third area of the PCB, a plurality of magnetic bodies that electromagnetically interact with the plurality of coils, including a first magnetic body disposed inside the camera assembly and facing the first area, a second magnetic body defining an inner surface of the camera housing and facing the second area, and a third magnetic body defining the inner surface of the camera housing and facing the third area, and wherein the camera assembly includes a fourth side area substantially facing the second magnetic body, a third side area facing the fourth side area, a second side area substantially facing the third magnetic body, a first side area facing the second side area, a first corner area formed between the first side area and the second side area, and a second corner area formed between the first side area and the fourth side area, wherein a first virtual side surface is defined extending from the first side area, and a second virtual side surface is defined extending from the third side area, in which a crossing of the first virtual side surface and the second virtual side surface forms a first virtual corner, and a second virtual corner is defined by crossing the first virtual side surface extending from the first side area with a virtual area extending from the fourth side area, wherein the first side area define a first corner together with the first corner area, wherein the first side area defines a second corner together with the second corner area, wherein the first virtual corner and the second virtual corner are spaced by a first distance away from each other, wherein the first virtual corner and the first corner are spaced by a first gap away from each other, wherein the second virtual corner and the second corner are spaced by a second gap away from each other, and wherein at least one of a first ratio of the first gap to the first distance and a second ratio of the second gap to the first distance ranges from 0.1 to 0.5.

BRIEF DESCRIPTION OF THE DRAWINGS

In the description with reference to the drawings, identical or similar reference symbols may be used for identical or similar elements.

DETAILED DESCRIPTION

Hereinafter, certain embodiments of the present disclosure will be described with reference to the accompanying drawings. However, this does not limit the present disclosure within specific embodiments, but it should be understood that the present disclosure covers all the modifications, equivalents, and alternatives for the embodiments of the present disclosure.

Figure 1:
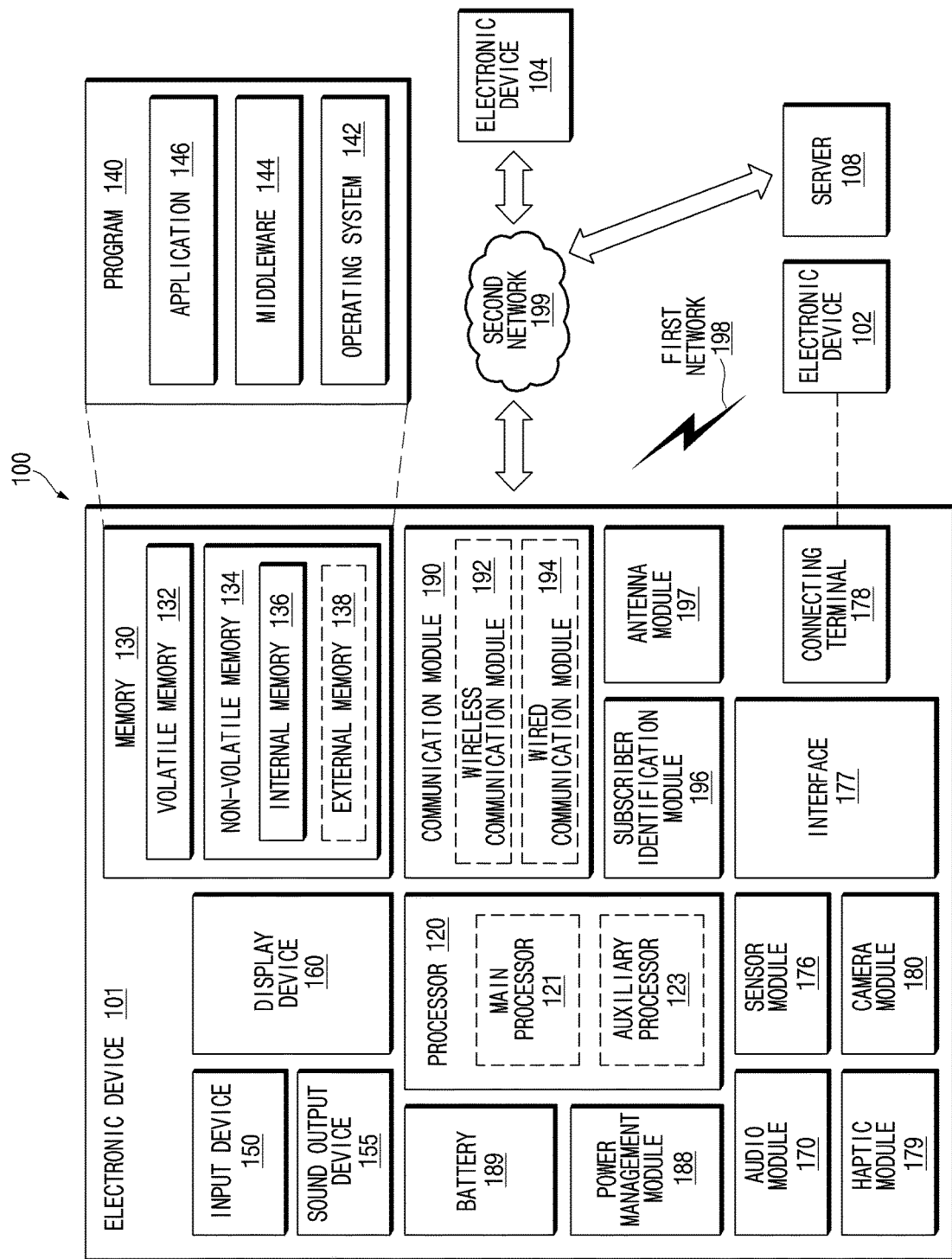
FIG. 1 is a block diagram illustrating an electronic device in a network environment according to certain embodiments.

FIG. 1 is a block diagram illustrating an electronic device 101 in a network environment 100 according to certain embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display module 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display module 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element implemented using a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
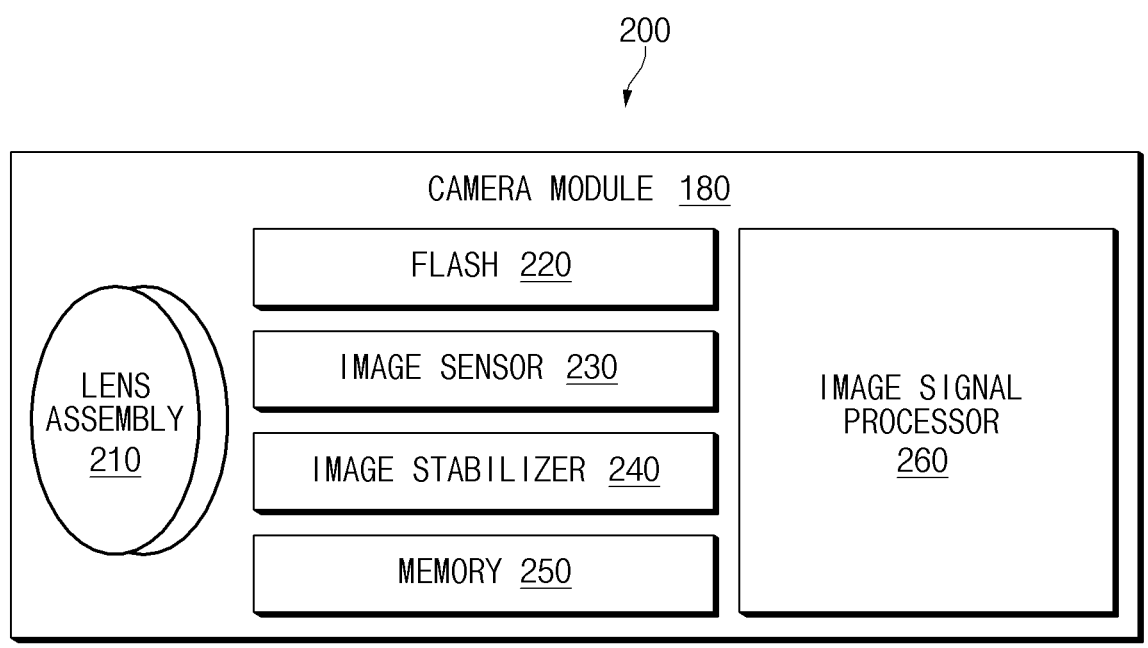
FIG. 2 is a block diagram illustrating a camera module according to certain embodiments.

FIG. 2 is a block diagram 200 illustrating the camera module 180 according to certain embodiments. Referring to FIG. 2, the camera module 180 may include a lens assembly 210 (e.g., including a lens 431 and a lens barrel 432 of FIG. 5), a flash 220, an image sensor 230 (e.g., an image sensor 419 of FIG. 13), an image stabilizer 240, a memory 250 (e.g., a buffer memory), or an image signal processor 260. The lens assembly 210 may collect light emitted or reflected from an object whose image is to be taken. The lens assembly 210 may include one or more lenses. According to an embodiment, the camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment, the flash 220 may include one or more light emitting diodes (LEDs) (e.g., a red-green-blue (RGB) LED, a white LED, an infrared (IR) LED, or an ultraviolet (UV) LED) or a xenon lamp. The image sensor 230 may obtain an image corresponding to an object by converting light emitted or reflected from the object and transmitted via the lens assembly 210 into an electrical signal. According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. According to an embodiment, the image stabilizer 240 may sense such a movement by the camera module 180 or the electronic device 101 using a gyro sensor (not shown) or an acceleration sensor (not shown) disposed inside or outside the camera module 180. According to an embodiment, the image stabilizer 240 may be implemented, for example, as an optical image stabilizer.

The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display module 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display module 160, the electronic device 102, the electronic device 104, or the server 108) outside the camera module 180. According to an embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display module 160 as it is or after being further processed.

According to an embodiment, the electronic device 101 may include a plurality of camera modules 180 having different attributes or functions. For example, a plurality of camera modules 180 including lenses (e.g., the lens assembly 210) having different viewing angles may be provided, and a change in viewing angle of the camera module 180, which is performed in the electronic device 101, may be controlled based on user's selection. In such a case, at least one of the plurality of camera modules 180 may form, for example, a wide-angle camera and at least another of the plurality of camera modules 180 may form a telephoto camera. Similarly, at least one of the plurality of camera modules 180 may form, for example, a front camera and at least another of the plurality of camera modules 180 may form a rear camera.

According to an embodiment, the plurality of camera modules 180 may include at least one of a wide-angle camera, a telephoto camera, or an infrared (IR) camera (e.g., a time of flight (TOF) camera), or a structured light camera. According to an embodiment, the IR camera may operate as at least a portion of the sensor module (e.g., the sensor module 176 of FIG. 1). For example, the TOF camera (e.g., the sensor module 316 of FIG. 3b) may operate as at least a portion of the sensor module (e.g., the sensor module 176 of FIG. 1) for sensing a distance from a component.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with" or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. In which, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

Figure 3A:
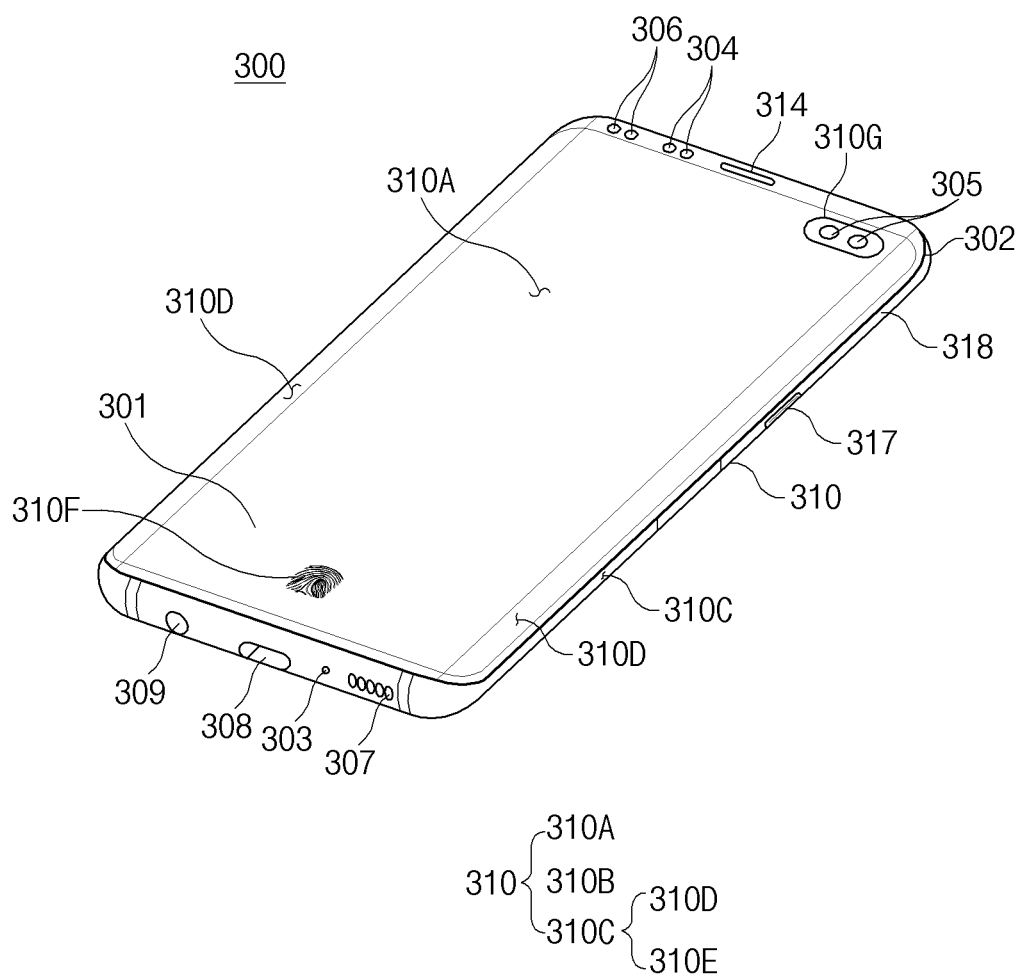
FIG. 3A is a front perspective view illustrating an electronic device according to an embodiment.
Figure 3B:
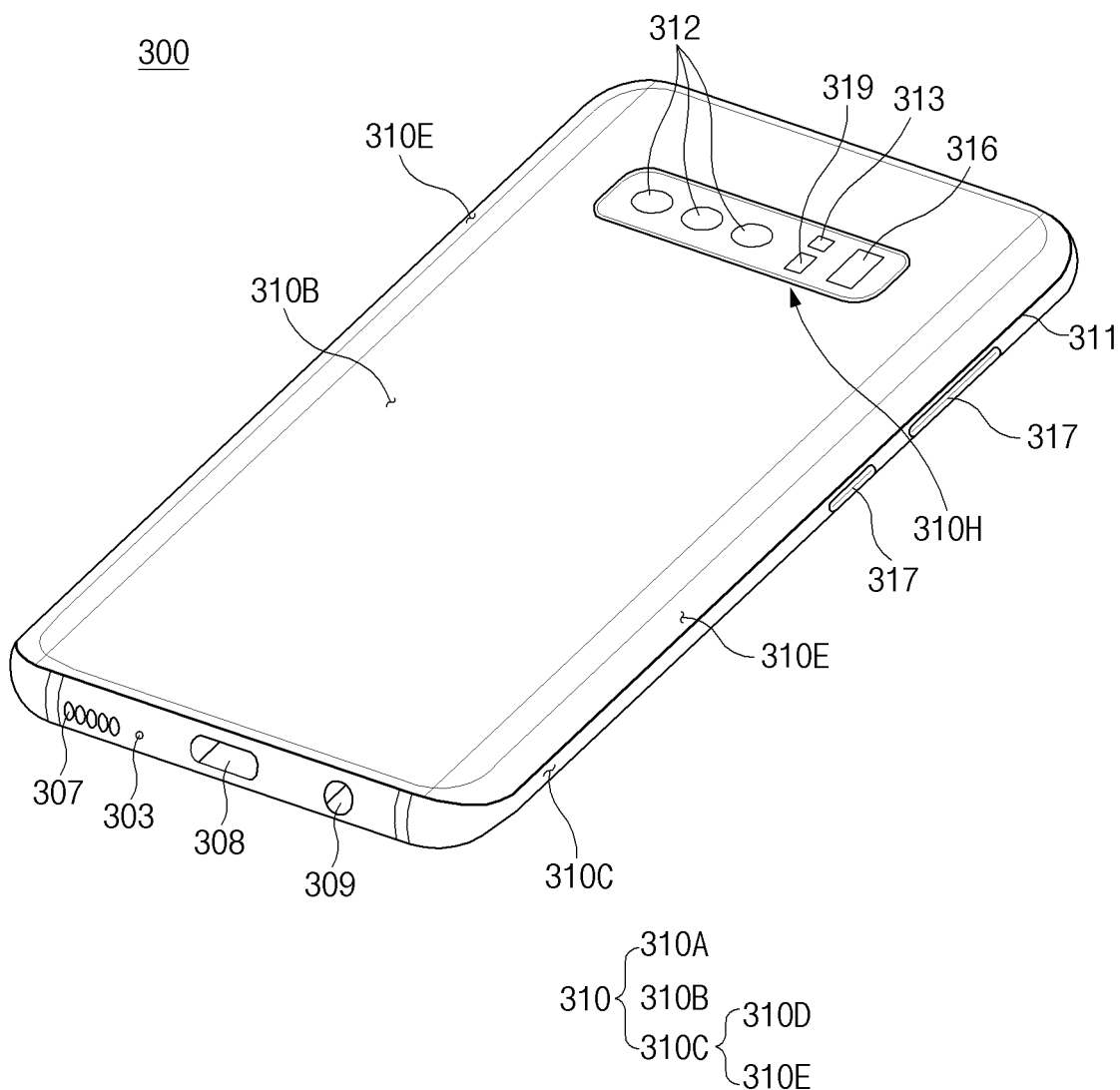
FIG. 3B and FIG. 3C are a rear perspective view illustrating the electronic device according to an embodiment.
Figure 3C:
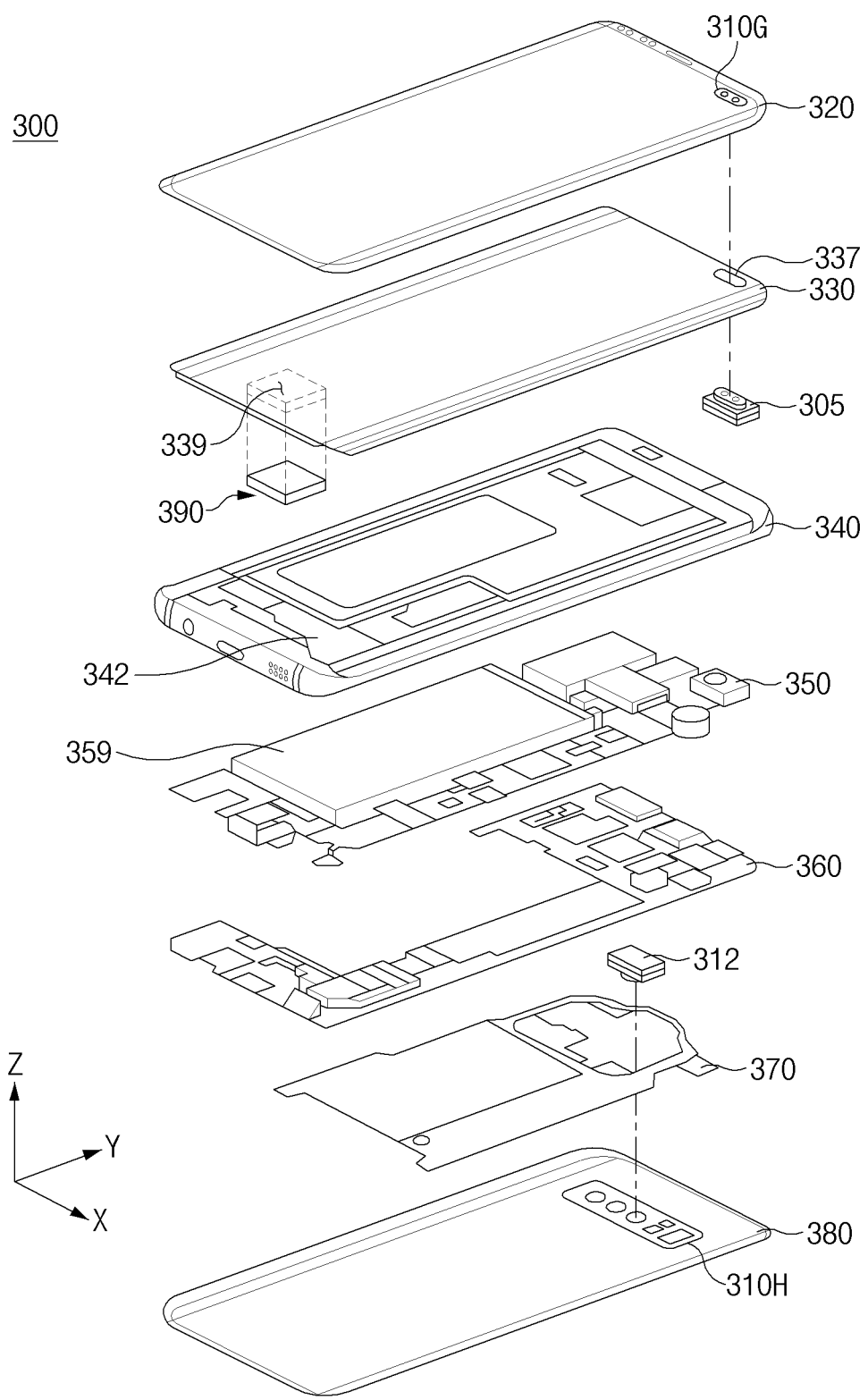

FIG. 3A is a front perspective view illustrating an electronic device according to an embodiment. FIG. 3B is a rear perspective view illustrating the electronic device according to an embodiment. FIG. 3C is an exploded perspective view of the electronic device according to an embodiment.

Referring to FIGS. 3A and 3B, an electronic device 300 according to an embodiment includes a housing 310 having a first surface (or front surface) 310A, a second surface (or rear surface) 310B, and a side surface 310C surrounding a space defined between the first surface 310A and the second surface 310B.

In another embodiment (not shown), the housing 310 may refer to a structure defining some of the first surface 310A, the second surface 310B, and the side surfaces 310C.

According to an embodiment, at least a portion of the first surface 310A may be defined by a substantially transparent front plate 302 (e.g., a glass plate including various coating layers, or a polymer plate). The second surface 310B may be defined by a substantially opaque rear plate 311. The back plate 311 may be defined by, for example, applied or colored glass, ceramic, a polymer, metal (e.g., aluminum, stainless steel (STS), or magnesium), or a combination of at least two of the above materials. The side surface 310C may be coupled to the front plate 302 and the rear plate 311 and may be defined by a side bezel structure (or "frame structure") 318 including metal and/or a polymer.

In some embodiments, the back plate 311 and the side bezel structure 318 may be integrated with each other and include the same material (e.g., a metal material such as aluminum).

In the illustrated embodiment, the front plate 302 may include two first areas 310D, which are curved toward the rear plate 311 from the first surface 310A and extend seamlessly, on both ends of each of long edges of the front plate 302.

In the illustrated embodiment, the rear plate 311 includes two second areas 310E, which are curved toward the front plate 302 from the second surface 310B and extend seamlessly, on both ends of each of long edges of the rear plate 311.

In some embodiments, the front plate 302 (or the rear plate 311) may include one of the first areas 310D (or the second areas 310E). In another embodiment, the front plate 302 (or the rear plate 311) may not include a portion of the first areas 310D (or the second areas 310E).

In the above embodiments, when viewed from a side of the electronic device 300, the side bezel structure 318 may have a first thickness (or a width) at a side (e.g., a short side) that belongs to the first areas 310D or the second areas 310E as described above and a second thickness less than the first thickness at a side (e.g., a long side) that is included in the first areas 310D or the second areas 310E.

According to an embodiment, the electronic device 300 may include at least one or more of a display 301, audio modules 303, 307, and 314 (e.g., the audio module 170 of FIG. 1), sensor modules 304, 316, and 319 (e.g., the sensor module 176 of FIG. 1), camera modules 305 and 312 (e.g., the camera module 180 of FIG. 1), a key input device 317 (e.g., the input device 150 of FIG. 1), a light emitting element 306, and connector holes 308 and 309 (e.g., the connection terminal 178 of FIG. 1). In some embodiments, in the electronic device 300, at least one (e.g., the key input device 317 and 317 or the light emitting element 306) of the components may be omitted, or other components may be added.

The display 301 may be exposed, for example, through a corresponding portion of the front plate 302. In some embodiments, at least a portion of the display 301 may be exposed through the front plate 302 including the first surface 310A and the first areas 310D of the side surface 310C.

In some embodiments, an edge of the display 301 may have substantially the same shape as an adjacent outer shape of the front plate 302. In another embodiment (not shown), in order to expand the area to which the display 301 is exposed, a distance between an outer portion of the display 301 and an outer portion of the front plate 302 may be substantially uniform.

In an embodiment, a surface of the housing 310 (or the front plate 302) may include a screen display area defined as the display 301 is visually exposed. For example, the screen display area may include the first surface 310A and the first areas 310D of the side surface.

In an embodiment, the screen display areas 310A and 310D may include a sensing area 310F configured to acquire biometric information of a user. Here, it may be understood as the meaning of "the screen display areas 310A and 310D include the sensing area 310F" means that at least a portion of the sensing area 310A overlaps the screen display areas 310A and 310D. For example, the sensing area 310F may mean an area that is capable of displaying visual information through the display 301, like other areas of the screen display areas 310A and 310D and is capable of additionally acquiring the user's biometric information (e.g., a fingerprint).

In an embodiment, the screen display areas 310A and 310D of the display 301 may include an area 310G to which the first camera module 305 (e.g., a punch hole camera) is visually exposed. For example, at least a portion of an edge of the area 310G to which the first camera module 305 is exposed may be surrounded by the screen display areas 310A and 310D. In certain embodiments, the first camera module 305 may include a plurality of camera modules (e.g., the camera module 180 of FIG. 1).

In another embodiment (not shown), a recess or opening is defined in a portion of the screen display areas 310A and 310D of the display 301, and at least one or more of the audio module 314, the first sensor module 304, and the light emitting element 306, which are aligned with the recess or opening, may be disposed on the portion of the screen display areas 310A and 310D.

In another embodiment (not shown), at least one or more of the audio module 314, the sensor modules 304, 316, and 319, and the light emitting element 306 may be disposed on rear surfaces of the screen display areas 310A and 310D of the display 301.

In another embodiment (not shown), the display 301 may be coupled to or disposed adjacent to a touch sensing circuit, a pressure sensor that is capable of measuring an intensity (pressure) of touch, and/or a digitizer that detects a magnetic field-type stylus pen.

In some embodiments, at least a portion of the sensor modules 304, 316, and 319 and/or at least a portion of the key input device 317 may be disposed on the side surface 310C (e.g., the first areas 310D and/or the second areas 310E).

The audio modules 303, 307, and 314 may include a microphone hole and speaker holes. A microphone for acquiring external sound may be disposed inside the microphone hole, and in some embodiments, a plurality of microphones may be disposed inside the microphone hole in order to sense a direction of the sound. The speaker holes may include an external speaker hole and a call receiver hole. In some embodiments, the speaker holes and the microphone hole may be implemented as a single hole, or a speaker may be provided without the speaker holes (e.g., a piezo speaker).

The sensor modules 304, 316, and 319 may generate electrical signals or data values corresponding to an internal operating state of the electronic device 300 or an external environmental state. For example, the sensor modules 304, 316, and 319 may include a first sensor module 304 (e.g., a proximity sensor) disposed on the first surface 310A of the housing 310, a second sensor module 316 (e.g., the TOF camera module) disposed on the second surface 310B of the housing 310, a third sensor module 319 (e.g., an HRM sensor) disposed on the second surface 310B of the housing 310, and/or a fourth sensor module 390 (e.g., a fingerprint sensor) coupled to the display 301.

In certain embodiments, the second sensor module 316 may include the TOF camera module for measuring a distance.

In certain embodiments, at least a portion of the fourth sensor module 390 may be disposed under the screen display areas 310A and 310D. For example, the fourth sensor module may be disposed in a recess 339 defined in the rear surface of the display 301. For example, the fourth sensor module 390 is not exposed to the screen display areas 310A and 310D, and a sensing area 310F may be defined on at least a portion of the screen display areas 310A and 310D.

In some embodiments (not shown), the fingerprint sensor may be disposed on the second surface 310B as well as the first surface 310A (e.g., the screen display areas 310A and 310D) of the housing 310.

In certain embodiments, the electronic device 300 may further include sensor modules that are not shown, for example, a gesture sensor, a gyro sensor, an atmospheric pressure sensor, a magnetic sensor, an acceleration sensor, a grip sensor, a color sensor, an IR (infrared) sensor, a biosensor, a temperature sensor, a humidity sensor, and an illuminance sensor.

The camera modules 305 and 312 may include a first camera module 305 (e.g., the punch hole camera module) exposed to the first surface 310A of the electronic device 300 and a second camera module 312 and/or a flash 313 exposed to the second surface 310B.

In an embodiment, the first camera module 305 may be exposed through a portion of the screen display area 310D of the first surface 310A. For example, the first camera module 305 may be exposed to a partial area of the screen display area 310D through an opening (not shown) defined in a portion of the display 301.

In an embodiment, the second camera module 312 may include a plurality of camera modules (e.g., a dual camera or a triple camera). However, the second camera module 312 is not necessarily limited as including the plurality of camera modules and thus may include one camera module.

The camera modules 305 and 312 may include one or more lenses, an image sensor, and/or an image signal processor. The flash 313 may include, for example, a light emitting diode or a xenon lamp. In some embodiments, two or more lenses (the infrared camera, the wide-angle lens, and the telephoto lens) and image sensors may be disposed on one surface of the electronic device 300.

The key input device 317 may be disposed on the side surface 310C of the housing 310. In another embodiment, the electronic device 300 may not include some or all of the above-described key input devices 317, and the key input device 317 that is not included may be implemented in a different form on the display 301, like a soft key. In some embodiments, the key input device may include a fourth sensor module 390 that defines the sensing area 310F included in the screen display areas 310A and 310D.

The light emitting element 306 may be disposed, for example, on the first surface 310A of the housing 310. The light emitting element 306 may provide, for example, state information of the electronic device 300 in the form of light. In another embodiment, the light emitting element 306 may provide, for example, a light source that is interlocked with an operation of the first camera module 305. The light emitting element 306 may include, for example, an LED, an IR LED, and/or a xenon lamp.

The connector holes 308 and 309 may include a first connector hole 308 that is capable of accommodating a connector (e.g., an USB connector) for transmitting and receiving power and/or data to and from an external electronic device and/or a second connector hole 309 (e.g., an earphone jack) that is capable of accommodating a connector for transmitting and receiving audio signal to and from the external electronic device.

Referring to FIG. 3C, the electronic device 300 may include a front plate 320 (e.g., the front surface 310A and the first area 310D of FIG. 3A), a display 330 (e.g., the display 301 of FIG. 3A), a bracket 340 (e.g., a portion of the side surface of FIG. 3A), a first support member 342 (e.g., the plate structure), a printed circuit board 350, a battery 359, a rear case 360, an antenna 370, and a rear plate 380 (e.g., the rear surface 310B and the second area 310E of FIG. 3A).

In some embodiments, at least one (e.g., the first support member 342 or the rear case 360) of the components may be omitted, or other components may be added. At least one of the components of the electronic device 300 may be the same as or similar to at least one of the components of the electronic device 300 of FIG. 3a or 3b, and thus, duplicated descriptions thereof will be omitted below.

The first support member 342 may be disposed inside the electronic device 300 in order to be connected to the bracket 340 or may be integrated with the bracket 340. The first support member 342 may be made of, for example, a metal material and/or a non-metal (e.g., polymer) material. In an embodiment, the first support member 342 may have one surface to which the display 330 is coupled and the other surface to which the printed circuit board 350 is coupled. A processor, a memory, and/or an interface may be mounted on the printed circuit board 350. The processor may include, for example, one or more of a central processing unit, an application processor, a graphic processing unit, an image signal processor, a sensor hub processor, or a communication processor.

The memory may include, for example, a volatile memory or a nonvolatile memory.

The interface may include, for example, a high definition multimedia interface (HDMI), a universal serial bus (USB) interface, an SD card interface, and/or an audio interface. The interface may, for example, electrically or physically connect the electronic device 300 to the external electronic device and may include a USB connector, an SD card/MMC connector, or an audio connector.

The battery 359 may be a device for supplying power to at least one component of the electronic device and may include, for example, a non-rechargeable primary cell, a rechargeable secondary cell, or a fuel cell. At least a portion of the battery 359 may be disposed, for example, on substantially the same plane as the printed circuit board 350. The battery 359 may be integrally disposed inside the electronic device 300 or may be disposed to be detachable from the electronic device 300.

The antenna 370 may be disposed between the rear plate 380 and the battery 359. The antenna 370 may include, for example, a near field communication (NFC) antenna, a wireless charging antenna, and/or a magnetic secure transmission (MST) antenna. The antenna 370 may perform, for example, short-range communication with the external device or may wirelessly transmit/receive power utilized for charging. In another embodiment, an antenna structure may be provided by a portion of the bracket 340 and/or the first support member 342 or a combination thereof.

In certain embodiments, the camera module 305 may be disposed inside the housing 310 so that the lens is exposed to the camera area 310G of the front surface 310A of the electronic device 300. For example, the camera area 310G may be defined on the first plate 320. For example, the camera module 305 may include a hole defined in the rear surface of the display 330 or a punch hole camera disposed inside a recess 337.

In certain embodiments, the camera module 312 may be disposed inside the housing 310 so that the lens is exposed to a camera area 310H of the rear surface 310B of the electronic device 300. For example, the camera module 312 may be disposed on the printed circuit board 350.

Figure 4:
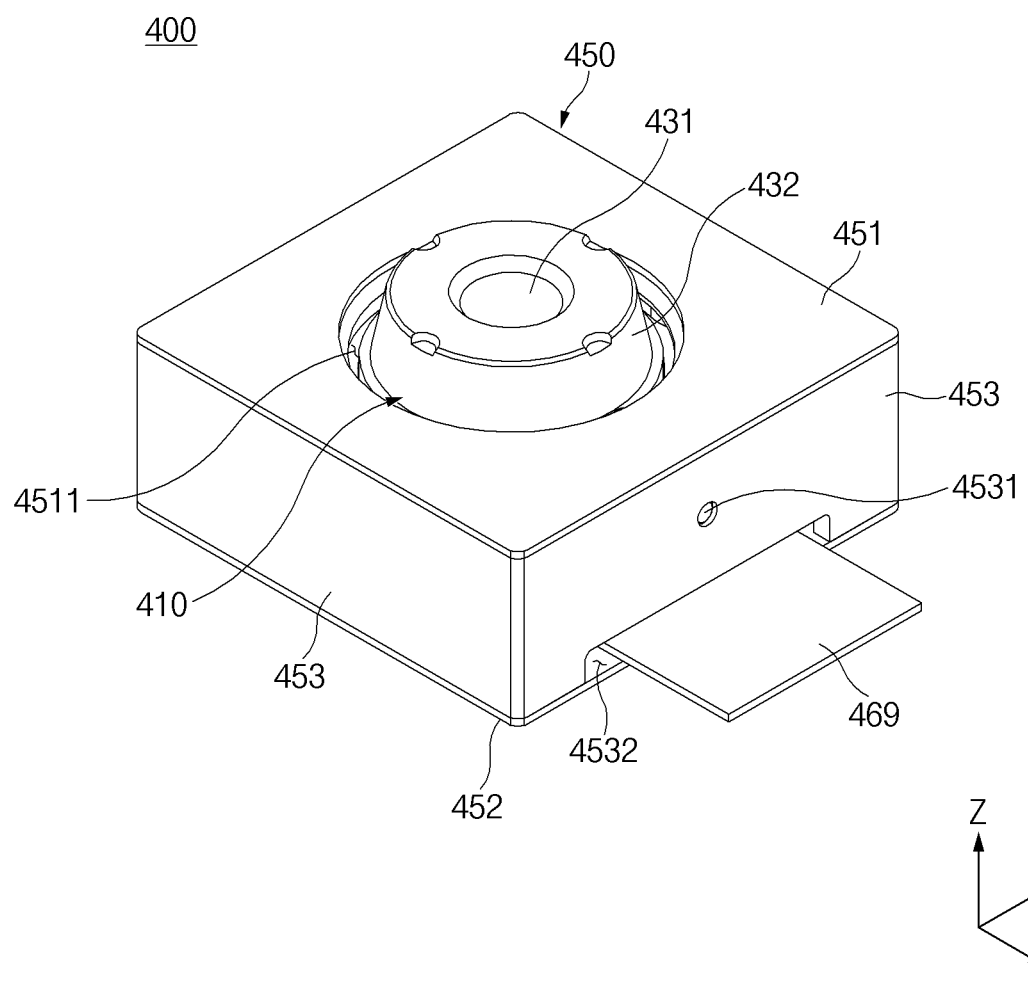
FIG. 4 is a perspective view of a camera module according to an embodiment.

FIG. 4 is a perspective view of a camera module according to an embodiment.

In an embodiment, a camera module 400 (e.g., the camera module 180 of FIG. 2 and the camera modules 305 and 312 of FIG. 3) may include a camera assembly 410 and a second camera housing 450 in which the camera assembly 410 is disposed. In certain embodiments, the second camera housing 450 may be a structure included in an electronic device (e.g., the electronic device 101 of FIG. 3).

In an embodiment, the second camera housing 450 may include a first surface 451 through which a lens 431 is exposed, a second surface 452 facing the first surface 451 in a −Z-axis direction, and a side surface 453 surrounding a space defined between the first surface 451 and the second surface 452. For example, the side surface 453 may define a surface extending in an X-axis and/or a Y-axis direction. In an embodiment, a first opening 4511 in which at least a portion of the lens 431 is disposed may be defined in the first surface 451. In an embodiment, a second opening 4531 and/or a third opening 4532 may be defined in the side surface 453. For example, an extension portion 469 extending outward from a PCB (e.g., a PCB 460 in FIG. 5) disposed inside the second camera housing 450 may be disposed in the third opening 4532. For example, the extended portion 469 may include a flexible printed circuit board (FPCB). For example, the extension portion 469 may extend to a substrate on which a processor (e.g., the processor 120 of FIG. 1) of an electronic device (e.g., the electronic device 101 of FIG. 1) is disposed.

In an embodiment, at least a portion of the camera assembly 410 may be disposed inside the second camera housing 450. For example, a portion of the camera assembly 410 may be visible from the exterior through the first opening 4511 defined in the first surface 451 of the second camera housing 450. In an embodiment, the camera assembly 410 may include a lens barrel 432 including at least one lens 431. The lens barrel 432 may have, for example, one or more lenses 431 disposed therein. The lens barrel 432 may be provided to surround the one or more lenses 431.

In an embodiment, the camera assembly 410 may rotate inside the second camera housing 450 so that an optical axis of the lens 431 has a predetermined angle with respect to the Z-axis. For example, the optical axis of the lens 431 may have a predetermined angle with respect to a normal vector of a front surface 310A, a rear surface 310B, or camera areas 310G and 310H of the electronic device 300 illustrated in FIG. 3A.

In an embodiment, at least a portion of the lens barrel 432 may be disposed to protrude from the first surface 451 of the second camera housing 450 through the first opening 4511 defined in the first surface 451 of the second camera housing 450. For example, the lens barrel 432 may be aligned with the first opening 4511. In an embodiment, the lens barrel 432 may move in the first opening 4511 according to a movement (e.g., moving) of the camera assembly 410. For example, the lens barrel 432 may perform movement (e.g., rotational movement or linear movement) about the X, Y, and Z-axes in the first opening 4511, and during the movement, an additional guide member (not shown) may be provided so as not to collide with the opening 4511.

Figure 5A:
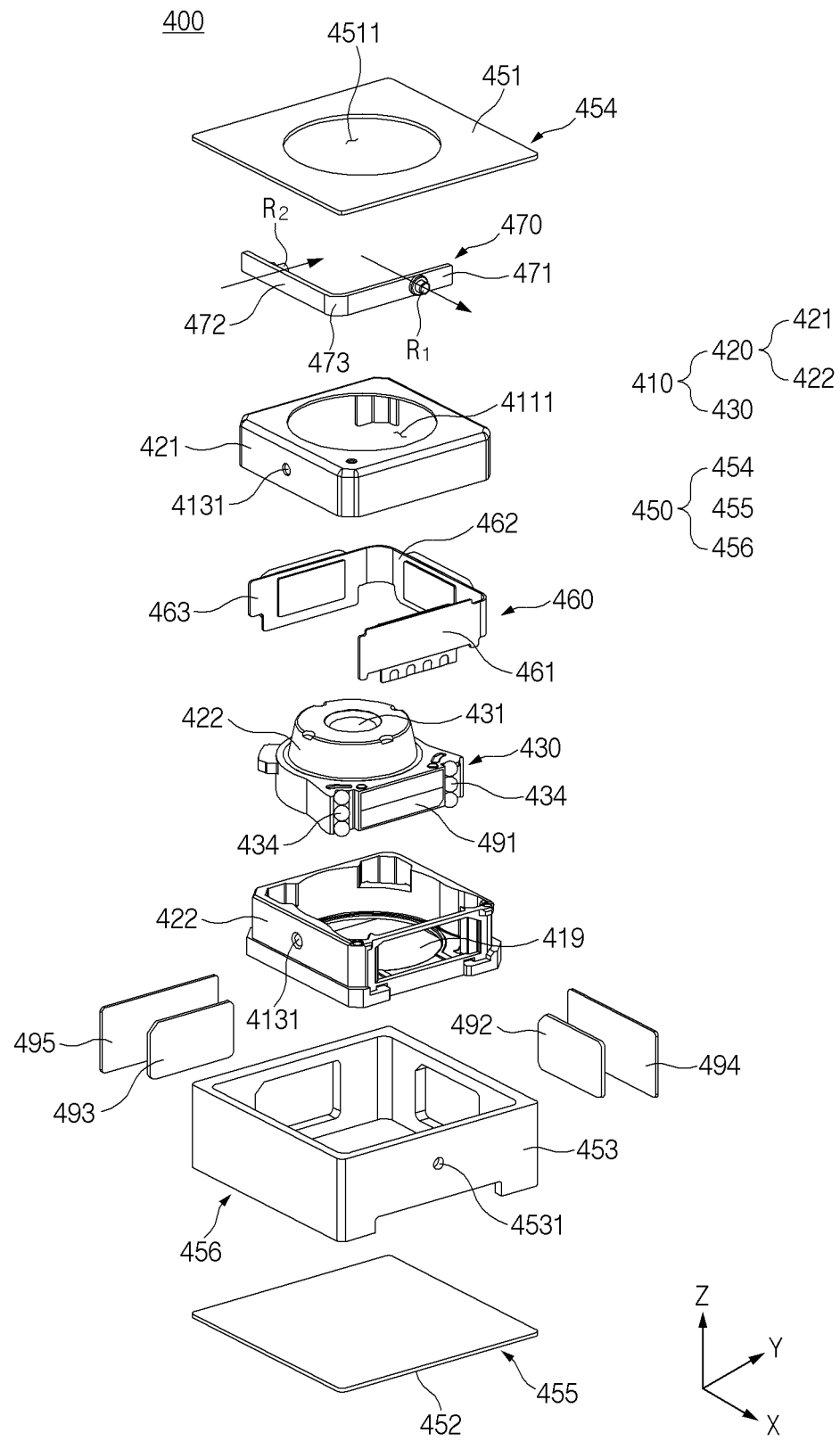
FIG. 5A and FIG. 5B are an exploded perspective view of the camera module according to an embodiment.
Figure 5B:
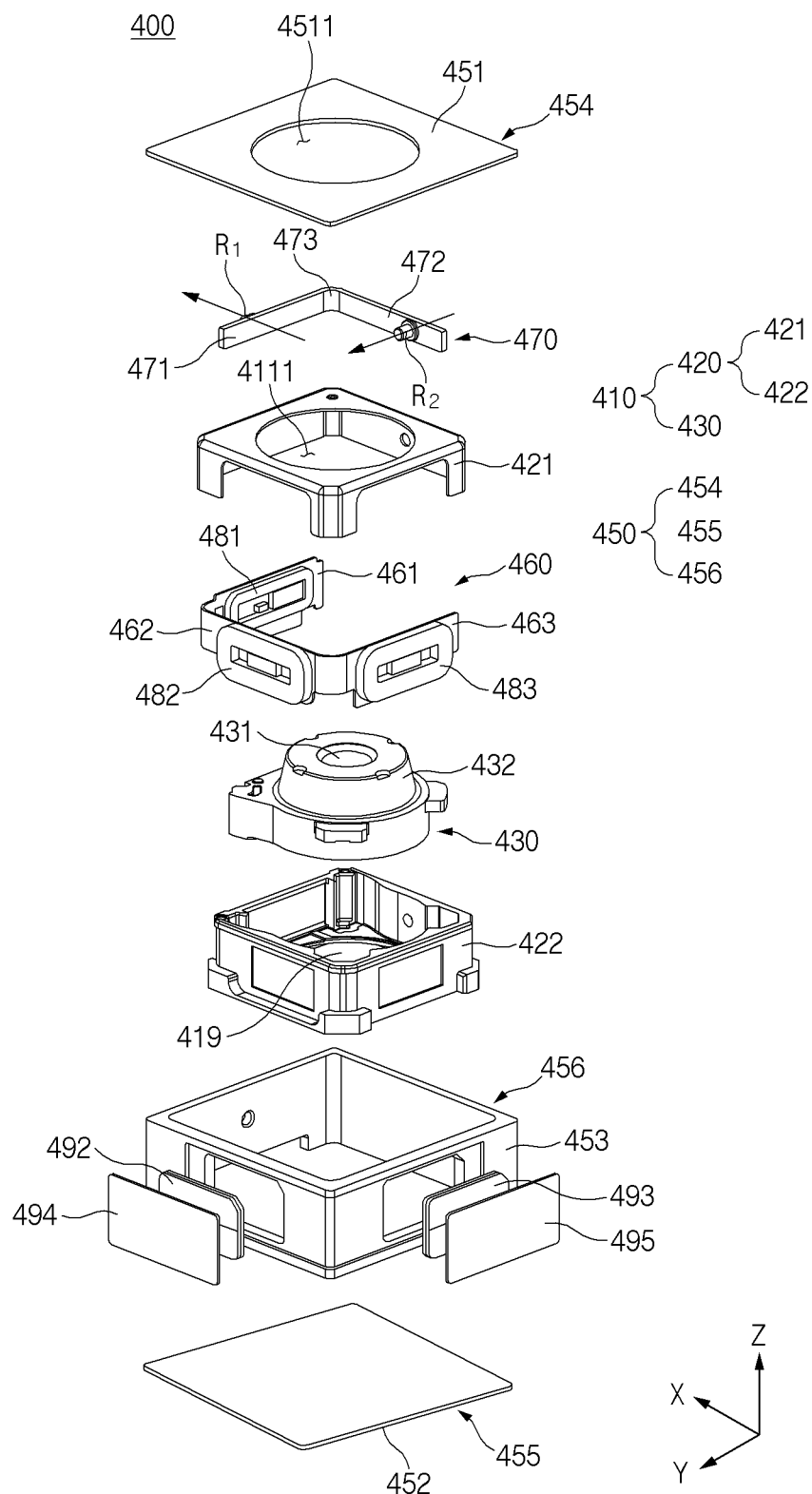

FIGS. 5A-5B are an exploded perspective view of the camera module according to an embodiment.

In an embodiment, the camera module 400 may include the second camera housing 450, the camera assembly 410, a PCB 460, and/or a connection member 470.

In an embodiment, the second camera housing 450 may include the first surface 451 in which the first opening is defined, a second surface 452 facing the first surface 451 in a −Z-axis direction, and/or a side surface 453 surrounding a space between the first surface 451 and the second surface 452. In an embodiment, the lens 431 may receive external light through the first opening 4511.

In certain embodiments, the second camera housing 450 may include a cover 454 forming the first surface 451, a side member 456 forming the side surface 453, and/or a base 455 forming the second surface 452. The cover 454, the base 455, and the side member 456 may define an inner space in which at least a portion of the camera assembly 410 and the PCB 460 are disposed. The side member 456 may form at least a portion of the side surface of the camera module 400. For example, the side members 456 may form side surfaces facing a direction that is substantially perpendicular to the optical axis (e.g., the Z-axis) of the lens 431 (e.g., the X-axis and the Y-axis). A second magnetic body 492 and a third magnetic body 493 (including a yoke 495) may be disposed on at least two side surfaces that are adjacent to each other According to an embodiment, the position of the second magnetic body 492 or the third magnetic body 493 is not limited to the illustrated embodiment. In certain embodiments, the position, size, or number of the second magnetic body 492 or the third magnetic body 493 may be changed. For example, the second magnetic body 492 may be disposed on a first side surface and/or a third side surface, which face each other, from among the side surfaces, and the second magnetic body 492 may be disposed on a second side surface disposed between the first side surface and the third side surface.

In an embodiment, the camera assembly 410 may include the first camera housing 420, a lens carrier 430, the image sensor (e.g., the image sensor 230 of FIG. 2 and an image sensor 419 of FIG. 13) and/or the PCB 460. The first camera housing 420 may include, for example, an upper frame 421 or a lower frame 422. For example, the upper frame 421 may be coupled to the lower frame 422 to define a space in which the lens carrier 430 is disposed. For example, an opening 4111 may be defined in the upper frame 421, through which a portion of the lens barrel 432 included in the lens carrier 430 is exposed. In an embodiment, the upper frame 421 may be provided as a shield can in order to provide shielding from electromagnetic waves. The opening 4111 may be aligned with, for example, the first opening 4511 of the second camera housing 450. The upper frame 421 may define, for example, at least some of the side surfaces of the camera assembly 410 together with the lower frame 422. In an embodiment, the PCB 460 may surround at least a portion of the camera assembly 410. The PCB 460 may include, for example, a flexible printed circuit board (FPCB).

In an embodiment, the PCB 460 may include a first coil disposed on the first area, a second coil 482 disposed on the second area 462, and a third coil 483 disposed on the third area 463.

In an embodiment, the first area 461 may face an extension direction (e.g., a Y-axis direction) of the first rotation shaft $R_1$. The second area 462 may face an extension direction (e.g., an X-axis direction) of the second rotation shaft $R_2$. The first area 461 and the second area 462 may be adjacent to each other. The third area 463 may be, for example, defined to face either the first area 461 or the second area 462.

In an embodiment, the lens carrier 430 may include the lens barrel 432. The lens barrel 432 may include at least one lens 431 therein. The lens carrier 430 may include a third magnetic body 493 and/or a plurality of balls 434, which are disposed on the side surfaces. The lens carrier 430 may be disposed in a space defined by the upper frame 421 and the lower frame 422. The lens carrier 430 may be disposed so that the third magnetic body 493 faces the third area 463 of the PCB 460.

In an embodiment, the connection member 470 may include a first portion 471 at which the first rotation shaft $R_1$ is disposed and a second portion 472 at which the second rotation shaft $R_2$ extending to be substantially perpendicular to the first rotation shaft $R_1$ is disposed. The connection member 470 may be disposed between the second camera housing 450 and the camera assembly 410.

In an embodiment, the first portion 471 of the connection member 470 may be disposed between the first area 461 of the PCB 460 and the second camera housing 450. The second portion 472 of the connection member 470 may be disposed between one surface of the camera assembly 410, which is not surrounded by the PCB 460, and the second camera housing 450.

In an embodiment, the connection member 470 may include a corner portion 473 defined between the first portion 471 and the second portion 472. The corner portion 473 may include a curved surface. Alternatively, the corner portion 473 may include a plane facing a direction different from a direction in which the plane of the first portion 471 and the plane of the second portion 472 are directed.

In an embodiment, the camera assembly 410 may rotate about the first rotation shaft $R_1$ (e.g., the X-axis) together with the connection member 470. For example, the second camera housing 450 may be fixed, and the first rotation shaft $R_1$ may be inserted into the second opening 4531 defined in the side surface of the second camera housing 450 in order to support rotation of the camera assembly 410 and the connection member 470.

In an embodiment, the camera assembly 410 may rotate about the second rotation shaft $R_2$ (e.g., the Y-axis). For example, the connection member 470 and the second camera housing 450 may be fixed, and the camera assembly 410 may rotate relative to the connection member 470 and the second camera housing 450. The second rotation shaft $R_2$ may be inserted into a second hole 4131 defined in the side surface of the camera assembly 410 in order to support the rotation of the camera assembly 410.

In an embodiment, the camera module 400 may further include a yoke 494 disposed on the side surface of the second camera housing 450. The yoke 494 may be disposed substantially parallel to the second magnetic body 492 and the third magnetic body 493. The yoke 494 may be made of a magnetic body. The yoke 494 may be disposed on the side surface of the second camera housing 450 so that magnetic fields generated by the second magnetic body 492 and the third magnetic body 493 do not extend to the outside of the camera module 400. For example, the magnetic fields may be generated in the yoke 494.

In certain embodiments, the electronic device (e.g., the electronic device 300 of FIG. 3) may include a camera housing related to the camera module 400 therein (e.g., the housing 310 of FIG. 3), and the camera housing may include a first camera housing 420 and a second camera housing 450.

Figure 6A:
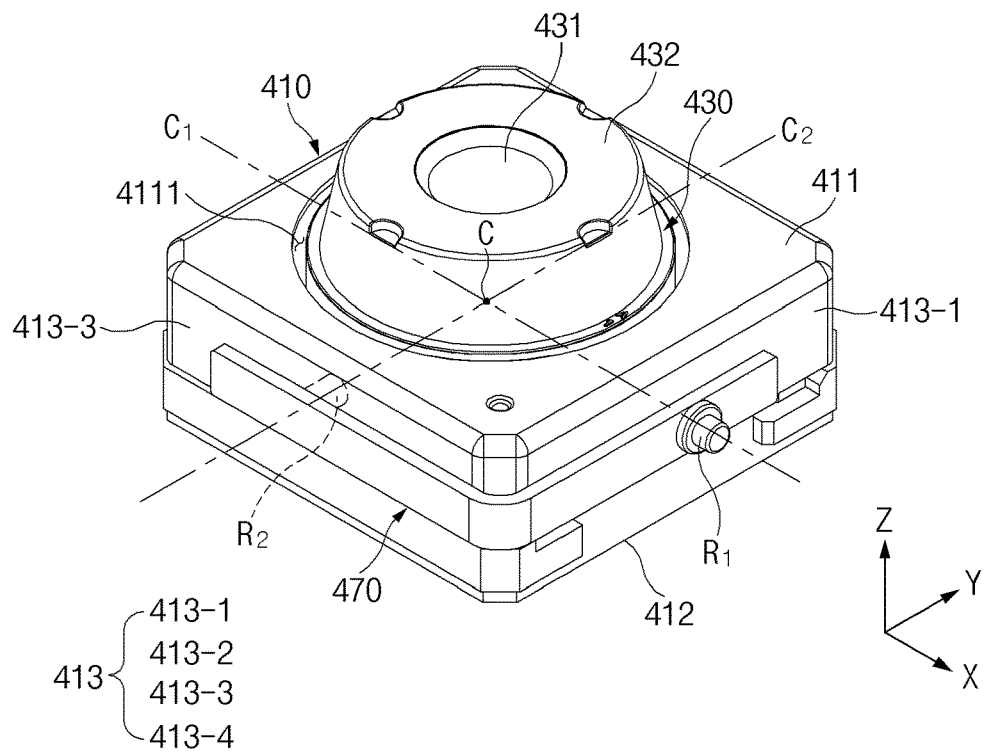
FIG. 6A and FIG. 6B are a view illustrating a camera assembly and a connection member of the camera module according to an embodiment.
Figure 6B:
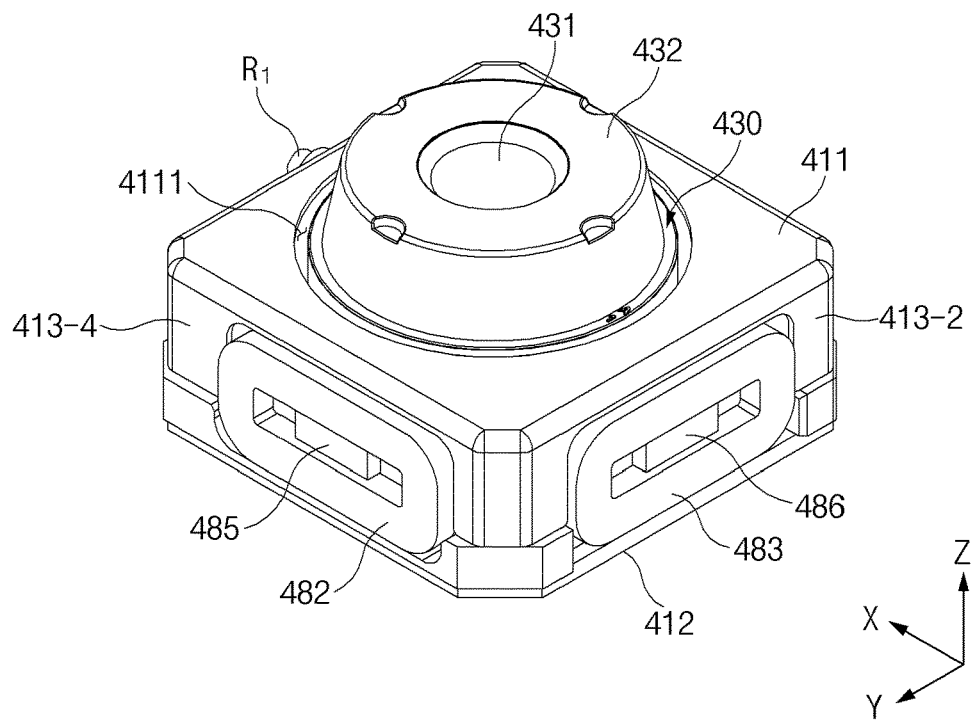

FIGS. 6A-6B show a view illustrating the camera assembly and the connection member of the camera module according to an embodiment.

In an embodiment, the connection member 470 may include a first rotation shaft $R_1$ and a second rotation shaft $R_2$, which are substantially perpendicular to each other. For example, the first rotation shaft $R_1$ may extend in the X-axis direction, and the second rotation shaft $R_2$ may extend in the Y-axis direction. In an embodiment, the connection member 470 may be coupled to a first side surface 413-1 of the camera assembly 410 and a third side surface 413-3 adjacent to the first side surface 413-1.

In an embodiment, the camera assembly 410 may include a top surface 411 to which the lens 431 is exposed, a bottom surface 412 facing the top surface 411, and a side surface defined between the top surface 411 and the bottom surface 412. For example, an opening 4111 through which the lens 431 and/or the lens barrier 432 are exposed may be defined in the top surface 411. In certain embodiments, at least a portion of the lens carrier 430 may be disposed inside the camera assembly 410, and a remaining portion of the lens carrier 430 may be disposed to protrude from the top surface 411 through the opening 4111.

In an embodiment, the side surface 413 may include a first side surface 413-1, a second side surface 413-2 facing the first side surface 413-1, a third side surface 413-3 connecting the first side surface 413-1 to the second side surface 413-2, and a fourth side surface facing the third side surface 413-3. For example, the first side surface 413-1 and the second side surface 413-2 may face the extension direction of the first rotation shaft $R_1$. The third side surface 413-3 and the fourth side surface 413-4 may face the extension direction of the second rotation shaft $R_2$.

In an embodiment, the first portion 471 of the connection member 470 may be coupled to the first side surface 413-1. In an embodiment, the second portion 472 of the connection member 470 may be coupled to the third side surface 413-3. For example, a second hole 4131 of FIG. 5 may be defined in the third side surface 413-3, and the third side surface 413-3 may be coupled to the connection member 470 through the second hole 4131.

In certain embodiments, a portion of the connection member 470 may be coupled to at least one of the side surfaces 413 facing the direction of the first rotation shaft $R_1$. In the illustrated embodiment, the first portion 471 of the connection member 470 may be coupled to the first side surface 413-1. In certain embodiments, a portion of the connection member 470 may be coupled to at least one of the side surfaces facing the direction of the second rotation shaft $R_2$. In the illustrated embodiment, the second portion 472 of the connection member 470 may be coupled to the third side surface 413-3.

However, the coupling relationship between the connection member 470 and the camera assembly 410 is not limited as illustrated in the drawings. For example, the connection member 470 may be disposed over adjacent side surfaces of the side surfaces 413 of the camera assembly 410. For example, the first portion 471 of the connection member 470 may be coupled to the second side surface 413-2, and the second portion 472 of the connection member 470 may be coupled to the fourth side surface 413-4.

In certain embodiments, at least one coil 482 and 483 may be disposed on a surface of the side surfaces 413 of the camera assembly, on which the connection member 470 is not disposed. For example, the third coil 483 may be disposed on the second side surface 413-2. For example, the second coil 482 may be disposed on the fourth side surface 413-4.

In an embodiment, the second coil 482 may be related to the rotation of the camera assembly 410 about the first rotation shaft $R_1$. The second coil 482 may be disposed on an area of the side surfaces 413 of the camera assembly 410, which faces a direction that is substantially perpendicular to the first rotation shaft $R_1$. For example, the second coil 482 may be disposed on the fourth side surface 413-4. In an embodiment, the third coil 483 may be related to the rotation of the camera assembly 410 about the second rotation shaft $R_2$. The third coil 483 may be disposed on an area of the side surfaces 413 of the camera assembly 410, which faces a direction that is substantially perpendicular to the second rotation shaft $R_2$. For example, the third coil 483 may be disposed on the second side surface 413-2.

In certain embodiments, the second coil 482 may be disposed on an area which faces the second portion 472 of the connection member 470. The third coil 483 may be disposed on an area facing the first portion 471 of the connection member 470. However, the positions of the second coil 482 and the third coil 483 are not limited as illustrated in the drawings. For example, the second coil 482 may be disposed on the third side surface 413-3 together with the connection member 470. Alternatively, the third coil 483 may be disposed on the first side surface 413-1 together with the connection member 470.

In certain embodiments, the first rotation shaft $R_1$ and the second rotation shaft $R_2$ may be provided at substantially the same height from the bottom surface 412 of the camera assembly 410 when viewed in the direction of the optical axis of the lens 431. Accordingly, a first virtual line $C_1$ extending from the first rotation shaft $R_1$ and a second virtual line $C_2$ extending from the second rotation shaft $R_2$ may define a virtual rotation center point C disposed inside the lens carrier 430. The rotation center point C may be disposed on the optical axis of the lens. In certain embodiments, the camera assembly 410 may rotate about the rotation center point C.

In certain embodiments, the camera module 400 may include a control circuit (not shown) configured to control the coils 482 and 483, a second sensor 485, and a third sensor 486.

In certain embodiments, the control circuit may control first rotation to rotate about the first rotation shaft $R_1$ of the camera assembly 410 based on a signal sensed from the second sensor 485. For example, the control circuit may sense the relative position of the second coil 482 with respect to the second magnetic body 492 disposed in the second camera housing 450 through the second sensor 485, and based on the sensed position, the control circuit may detect the current rotation angle of the camera assembly 410 and control current (e.g., intensity and direction) applied to the second coil 482 in order to reduce an offset between the current rotation angle and a target rotation angle.

In certain embodiments, the control circuit may control second rotation of the camera assembly 410 about the second rotation shaft $R_2$ based on a signal sensed from the third sensor 486. For example, the control circuit may sense the relative position of the third coil 483 with respect to the third magnetic body 493 disposed in the third camera housing 450 through the third sensor 486, and based on the sensed position, the control circuit may detect the current rotation angle of the camera assembly 410 and control current (e.g., intensity and direction) applied to the third coil 483 in order to reduce an offset between the current rotation angle and a target rotation angle.

Figure 7A:
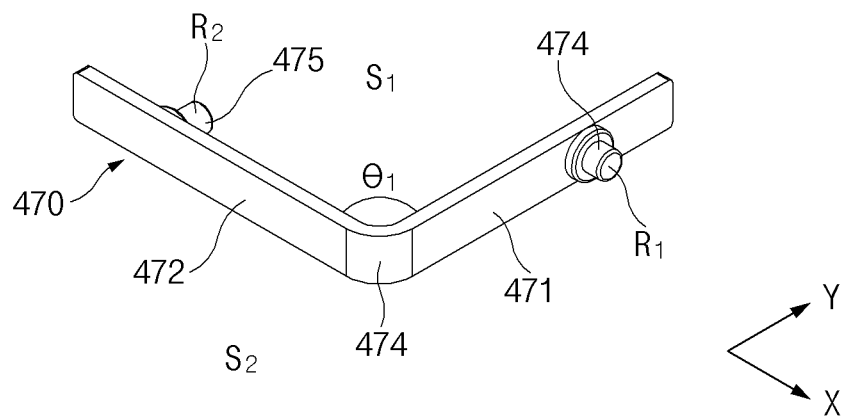
FIG. 7A and FIG. 7B are a view illustrating the connection member of the camera module according to an embodiment.
Figure 7B:
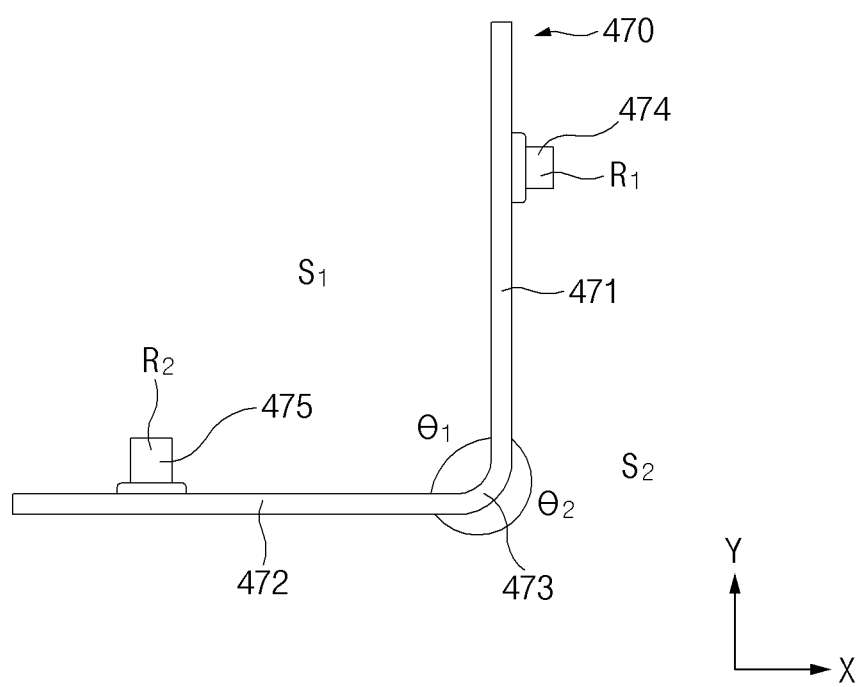

FIGS. 7A-7B are a view illustrating the connection member of the camera module according to an embodiment. FIG. 7a is a perspective view of the connection member, and FIG. 7b is a plan view of the connection member.

In an embodiment, the connection member 470 may include a first portion 471 at which the first rotation shaft $R_1$ is disposed, and a second portion 472 at which the second rotation shaft $R_2$ is disposed. The first portion 471 may include a plane facing the same direction as the extension direction of the first rotation shaft $R_1$. The second portion 472 may include a plane facing the same direction as the extension direction of the second rotation shaft $R_2$.

In certain embodiments, the connection member 470 may include a corner portion 473 defined between the first portion 471 and the second portion 472. For example, the corner portion 473 may include a curved surface. As another example, the corner portion 473 may include a surface facing a direction different from a direction in which the plane of the first portion 471 and the plane of the second portion 472 are directed.

Figure 9:
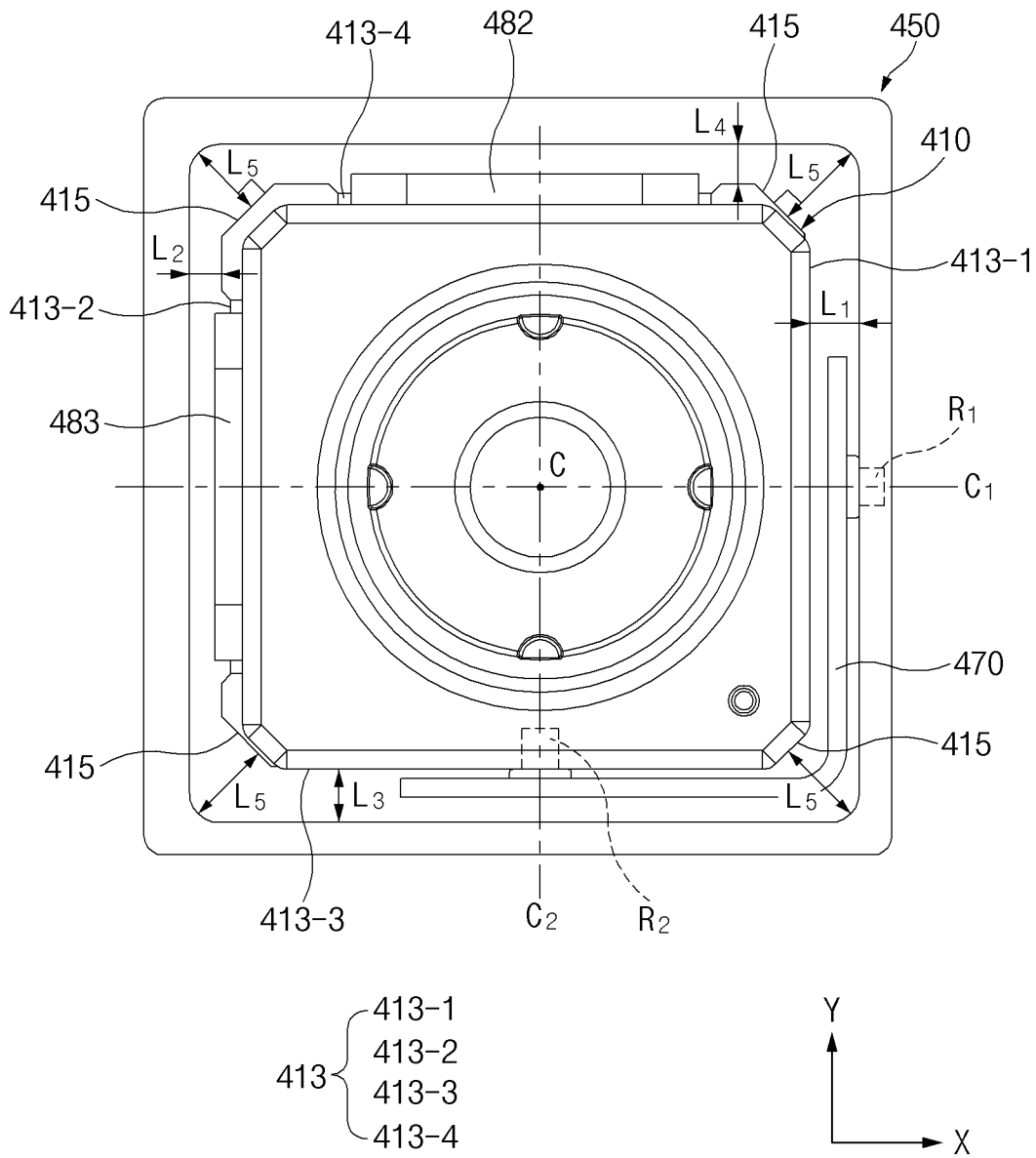
FIG. 9 is a plan view illustrating the camera module according to an embodiment.

In certain embodiments, in the connection member 470, a corner portion 473 may be in contact with a corner area (e.g., the corner area 415 of FIG. 9) of the camera assembly (e.g., the camera assembly 410 of FIG. 9) or may be disposed to be spaced a predetermined gap from a corner area (e.g., the corner area 415 of FIG. 9) of the camera assembly (e.g., the camera assembly 410 of FIG. 9).

In certain embodiments, the first rotation shaft $R_1$ may protrude from the first portion 471 of the connection member 470. For example, the first rotation shaft $R_1$ may protrude in a +X-axis direction. The second rotation shaft $R_2$ may protrude from the second portion 472 of the connection member 470. For example, the second rotation shaft $R_2$ may protrude in a +Y-axis direction.

In certain embodiments, the connection member 470 may include a first protrusion 474 protruding from the first portion 471 and providing the first rotation shaft $R_1$ and a second protrusion 475 protruding from the second portion 472 and providing the second rotation shaft $R_2$.

In certain embodiments, an inner region $S_1$ in which the first portion 471 and the second portion 472 have a relatively small angle $\theta_1$ (e.g., less than 180 degrees) and an outer region $S_2$ in which the first portion 471 and the second portion 472 have a relatively large angle $\theta_2$ (e.g., greater than 180 degrees) may be defined. In this case, the first rotation shaft $R_1$ may protrude to the outer region $S_2$, and the second rotation shaft $R_2$ may protrude to the inner region $S_1$. For example, the first rotation shaft $R_1$ may be coupled to be accommodated in the second opening 4531 of the second camera housing 450. As another example, the second rotation shaft $R_2$ may be coupled to be accommodated in the second hole 4131 of the camera assembly 410.

In certain embodiments, the shapes of the first portion 471 and the second portion 472 are not limited to the illustrated embodiment, and the first portion 471 and the second portion 472 may be changed. For example, the connection member 470 may be implemented by a plurality of first portions 471 and a plurality of second portions 472 in order to define a hinge structure (not shown) implemented by four surfaces facing different directions. In the above embodiment, the hinge structure (not shown) may be provided in a substantially rectangular shape or cross shape.

In certain embodiments, the positions of the first rotation shaft $R_1$ and the second rotation shaft $R_2$ may be changed. For example, the first rotation shaft $R_1$ may protrude to the outer region $S_2$ of the connection member 470, and the second rotation shaft $R_2$ may protrude to the inner region $S_1$. In addition, a third rotation shaft (not shown) may protrude to the inner region $S_1$ at the corner portion 473, and the camera assembly (e.g., the camera assembly 410 of FIGS. 6A-6B) may rotate using the third rotation shaft (not shown).

Figure 8:
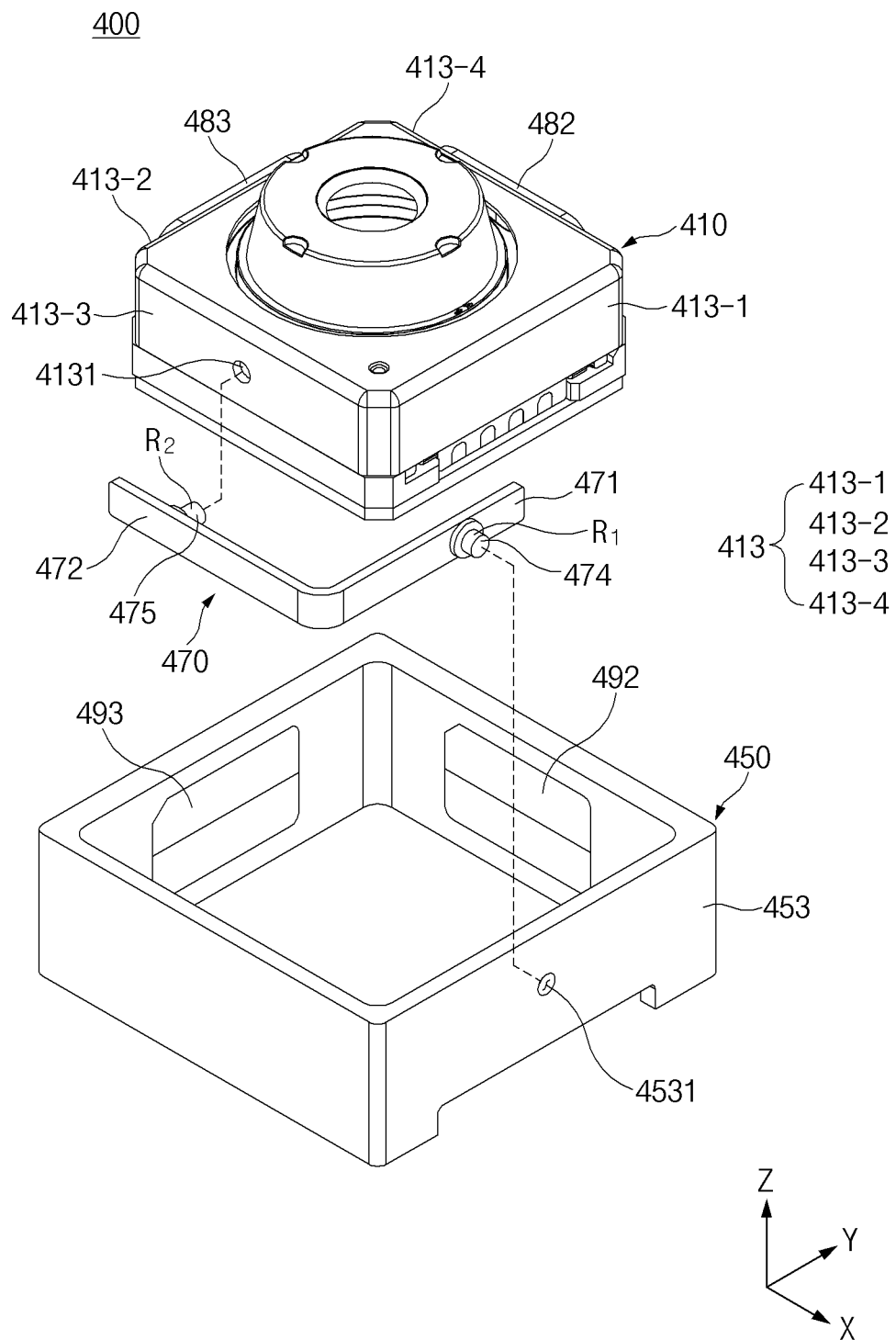
FIG. 8 is a view illustrating the camera assembly, the connection member, and a camera housing of the camera module according to an embodiment.

FIG. 8 is a view illustrating the camera assembly, the connection member, and the camera housing of the camera module according to an embodiment.

In an embodiment, the connection member 470 may be disposed between the camera assembly 410 and the second camera housing 450. For example, the connection member 470 may be disposed between the side surface 413 of the camera assembly 410 and the inner surface of the second camera housing 450, which faces the side surface of the camera assembly 410.

In an embodiment, the connection member 470 may be disposed on the adjacent side surface of the camera assembly 410. For example, the connection member 470 may be coupled to the camera assembly 410 so that the first portion 471 of the connection member 470 is disposed adjacent to the first side surface 413-1 of the camera assembly 410, and the second portion 472 of the connection member 470 is disposed adjacent to the third side surface 413-3 of the camera assembly 410.

In an embodiment, the connection member 470 may be disposed between the camera assembly 410 and the second camera housing 450 so that the first rotation shaft $R_1$ faces the second camera housing 450, and the second rotation shaft $R_2$ faces the camera assembly 410.

In certain embodiments, the first protrusion 474 of the connection member 470 may protrude from the first portion 471. The first protrusion 474 may be inserted into the second opening 4531 of the second camera housing 450 to provide support for the first rotation shaft $R_1$.

In certain embodiments, the second protrusion 475 of the connection member 470 may protrude from the second portion 472. The second protrusion 475 may be inserted in the second hole 4131 of the camera assembly 410 to provide support for the first rotation shaft $R_1$.

In an embodiment, the second camera housing 450 may include a second opening 4531 defined in a portion of the side surface 453. For example, the second opening 4531 may be defined in an area of the side surfaces of the second camera housing 450, which faces the first side surface 413-1 of the camera assembly 410. The first rotation shaft $R_1$ of the connection member 470 may be accommodated in the second opening 4531. The connection member 470 may be coupled to the second camera housing 450 so that the first rotation shaft $R_1$ extends into the second opening 4531. The second opening 4531 may support the first rotation shaft $R_1$ when the connection member 470 rotates.

In certain embodiments, the second opening 4531 may be defined in a side member (e.g., side member 456 of FIG. 5) defining at least a portion of the side surface 453 of the second camera housing 450.

Referring to the drawing, the second opening 4531 is illustrated to pass through the side surface 453 of the second camera housing 450, but the structure in which the first rotation shaft $R_1$ is inserted is not limited as illustrated in the drawing. For example, the first rotation shaft $R_1$ may be disposed on an inner surface of the second camera housing 450 and may be rotatably coupled to a groove that does not pass through the inner surface.

In an embodiment, the camera assembly 410 may include a second hole 4131 defined in the third side surface 413-3. The second rotation shaft $R_2$ of the connection member 470 may be accommodated in the second hole 4131. The connection member 470 may be coupled to the camera assembly 410 so that the second rotation shaft $R_2$ extends into the second hole 4131. The second rotation shaft $R_2$ may support the camera assembly 410 if the camera assembly 410 rotates.

Referring to the drawing, the second hole 4131 is illustrated to pass through the third side surface 413-3 of the camera assembly 410, but the structure in which the second rotation shaft $R_2$ is inserted is not just limited as illustrated in the drawing. For example, the second rotation shaft $R_2$ may be disposed on the third side surface 413-3 of the camera assembly 410 and may be rotatably coupled to a groove that does not pass through the third side surface 413-3.

In an embodiment, the connection member 470 may be disposed between the camera assembly 410 and the second camera housing 450 so that the first rotation shaft $R_1$ is inserted into the second opening 4531, and the second rotation shaft $R_2$ is inserted into the second hole 4131.

In another embodiment, the first rotation shaft $R_1$ may protrude from the inner surface of the second camera housing 450, and a hole into which the first rotation shaft $R_1$ is rotatably inserted may be defined in the first portion 471 of the connection member 470.

In another embodiment, the second rotation shaft $R_2$ may protrude from the third side surface 413-3 of the camera assembly 410, and a hole into which the second rotation shaft $R_2$ is rotatably inserted may be defined in the second portion 472 of the connection member 470.

FIG. 9 is a plan view illustrating the camera module according to an embodiment.

In an embodiment, the camera module 400 may include the second camera housing 450, the camera assembly 410 (as disposed inside the second camera housing 450), and/or the connection member 470 (as disposed between the camera assembly 410 and the second camera housing 450).

In an embodiment, the third coil 483 may be disposed on the second side surface 413-2 of the camera assembly 410, and the second coil 482 may be disposed on the fourth side surface 413-4 of the camera assembly.

In an embodiment, the camera assembly 410 may be rotatable relative to the second camera housing 450 inside the second camera housing 450 with respect to at least two shafts (e.g., the first rotation shaft $R_1$ and the second rotation shaft $R_2$), which may be substantially perpendicular to each other. In certain embodiments, the camera assembly 410 may be configured to enable a first rotation about the first rotation shaft $R_1$ and a second rotation about the second rotation shaft $R_2$. For example, the first rotation of the camera assembly 410 may be performed together with the connection member 470. As another example, the second rotation of the camera assembly 410 may be performed separately from the connection member 470. During the second rotation, the connection member 470 may be fixed to the second camera housing 450. The first rotation and the second rotation may be performed simultaneously or separately (e.g., sequentially).

In certain embodiments, the camera assembly 410 may be configured to enable a third rotation in which the first rotation and the second rotation are simultaneously performed. For example, the third rotation may include movement to rotate around a virtual rotation center point C defined by a first virtual line $C_1$ from which the first rotation shaft $R_1$ extends and a second virtual line $C_2$ from which the second rotation shaft $R_2$ extends.

In an embodiment, the inner surface of the second camera housing 450 and the side surface 413 of the camera assembly 410 may be spaced a predetermined gap from each other. The predetermined gap may be related to a rotation radius of the camera assembly 410. For example, if the camera assembly 410 rotates sequentially and/or simultaneously about the first rotation shaft $R_1$ and/or the second rotation shaft $R_2$, the side surface 413 of the camera assembly 410 or the coils 482 and 483 may collide with the inner surface of the second camera housing 450. In order to prevent this phenomenon, a predetermined space may be defined between the inner surface of the second camera housing 450 and the camera assembly 410.

In an embodiment, the camera assembly 410 may include a corner area 415 defined on the side surface 413 of the camera assembly 410. The corner area 415 may face a direction different from the direction facing the side surface 413. The corner area 415 may be defined, for example, in a substantially planar shape.

Referring to FIG. 9, the camera assembly 410 may be disposed so that the first side surface 413-1 is spaced a first distance $L_1$ from the inner surface of the second camera housing 450 facing the first side surface 413-1. The first distance $L_1$ may be, for example, a distance measured in the X-axis direction (e.g., the extension direction of the first rotation shaft $R_1$) from the first side surface 413-1. The first distance $L_1$ may be, for example, the shortest distance between the first side surface 413-1 and the inner surface of the second camera housing 450.

Referring to FIG. 9, the camera assembly 410 may be disposed so that the second side surface 413-2 is spaced a second distance $L_2$ from the inner surface of the second camera housing 450 facing the second side surface 413-2. The second distance $L_2$ may be, for example, a distance measured in the –X-axis direction (e.g., the extension direction of the first rotation shaft $R_1$) from the second side surface 413-2. The second distance $L_2$ may be, for example, the shortest distance between the second side surface 413-2 and the inner surface of the second camera housing 450.

Referring to FIG. 9, the camera assembly 410 may be disposed so that the third side surface 413-3 is spaced a third distance $L_3$ from the inner surface of the second camera housing 450 facing the third side surface 413-3. The third distance $L_3$ may be, for example, a distance measured in the Y-axis direction (e.g., the extension direction of the second rotation shaft $R_2$) from the third side surface 413-3. The third distance $L_3$ may be, for example, the shortest distance between the third side surface 413-3 and the inner surface of the second camera housing 450.

Referring to FIG. 9, the camera assembly 410 may be disposed so that the fourth side surface 413-4 is spaced a fourth distance $L_4$ from the inner surface of the second camera housing 450 facing the fourth side surface 413-4. The fourth distance $L_4$ may be, for example, a distance measured in the Y-axis direction (e.g., the extension direction of the second rotation shaft $R_2$) from the fourth side surface 413-4. The fourth distance $L_4$ may be, for example, the shortest distance between the fourth side surface 413-4 and the inner surface of the second camera housing 450.

Referring to FIG. 9, the camera assembly 410 may be spaced a fifth distance $L_5$ from the corner area 415 to the inner surface of the second camera housing 450 adjacent to the corner area 415. The fifth distance $L_5$ may be, for example, a distance measured in a direction perpendicular to the corner area 415. For example, if the corner area 415 includes a plane, the fifth distance $L_5$ may be a distance measured in the direction of a normal vector of the plane.

In certain embodiments, the fifth distance $L_5$ is illustrated as the distance from the corner area 415 to the inner surface of the second camera housing 450 adjacent to the corner area, but the fifth distance $L_5$ may be variously set according to the position of the camera assembly 410 and/or the shape (e.g., a rectangular shape) of the second camera housing 450.

In some embodiments, the rotation center point C of the camera assembly 410 may not coincide with a physical center point of the camera assembly 410. For example, the camera assembly 410 may be provided in a rectangular shape of which a length in the X-axis direction is longer than a length in the Y-axis direction. In this case, the fifth distance $L_5$ may be different according to each corner area 415. In certain embodiments, the camera assembly 410 may have a rectangular parallelepiped shape that extends longer from the rotation center point C in a direction (e.g., +X-axis direction) in which the first magnetic body (e.g., the first magnetic body 481 of FIG. 5 and the ball 434 of FIG. 5) is disposed.

In certain embodiments, if the position of the rotation center point C of the camera assembly 410 moves in a X/–X-axis direction or Y/–Y-axis direction from a center point (not shown) of the second camera housing 450, the fifth distance $L_5$ may be defined as distances different from each other.

In certain embodiments, in the camera assembly 410 may be disposed inside the second camera housing 450 so that the fifth distance $L_5$ is greater than each of the first distance $L_1$, the second distance $L_2$, the third distance $L_3$, and the fourth distance $L_4$.

In certain embodiments, the third coil 483 may be disposed closer to the inner surface of the second camera housing 450 than the second side surface 413-2 of the camera assembly 410. The second coil 482 may be disposed closer to the inner surface of the second camera housing 450 than the fourth side surface 413-4 of the camera assembly 410.

Figure 10A:
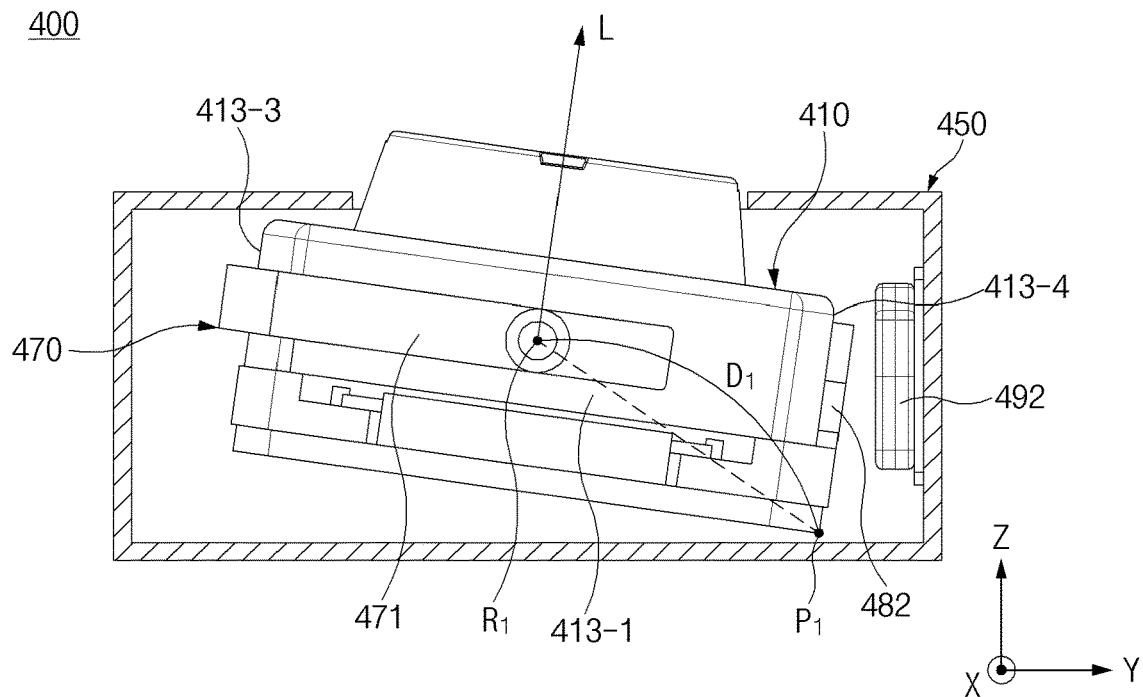
FIG. 10A and FIG. 10B are a view illustrating the camera assembly of the camera module according to an embodiment.
Figure 10B:
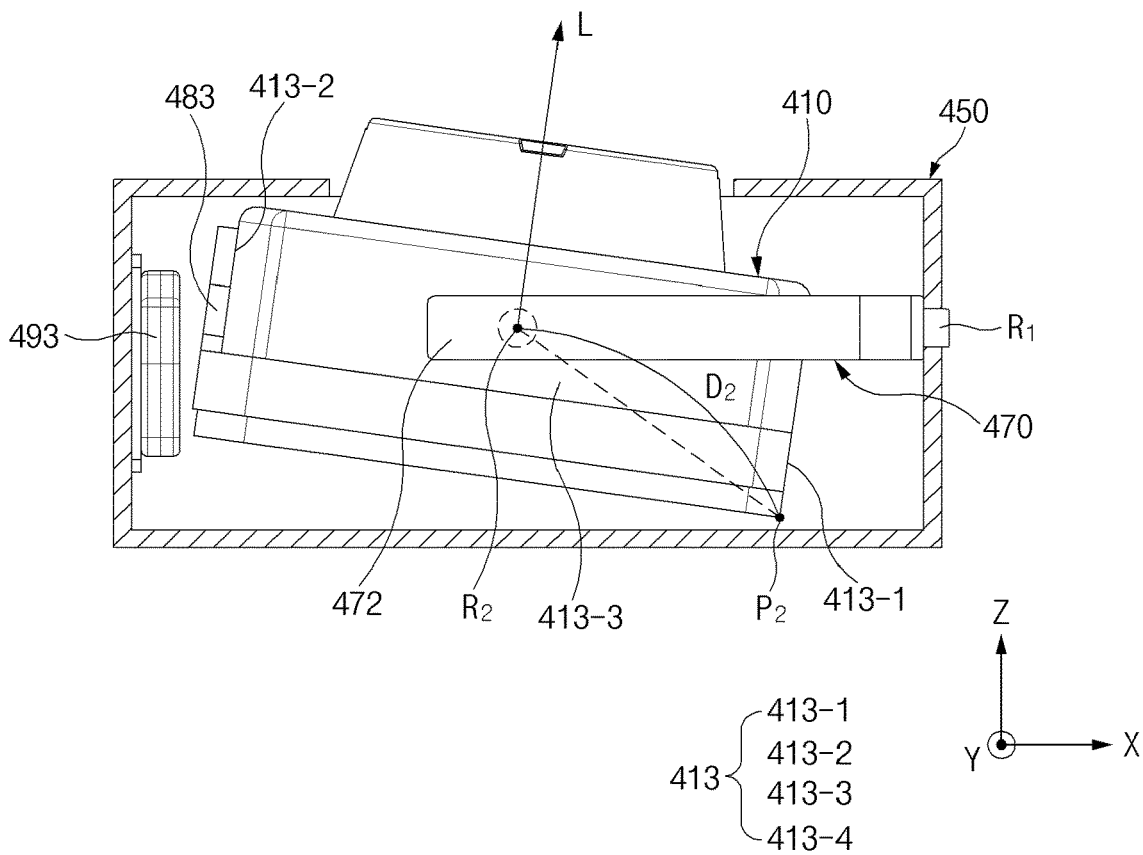

FIGS. 10A-10B are a view illustrating the camera assembly of the camera module according to an embodiment. FIG. 10a is a view illustrating first rotation of the camera assembly. FIG. 10a is a view illustrating second rotation of the camera assembly.

In an embodiment, the first rotation may be movement in which the camera assembly 410 rotates about the first rotation shaft $R_1$, and the second rotation may be movement in which the camera assembly 410 rotates about the second rotation shaft $R_2$.

In an embodiment, the camera assembly 410 may rotate about the first rotation shaft $R_1$ with respect to the second camera housing 450 together with the connection member 470. For example, the camera assembly 410 may be coupled to the connection member 470 in a direction that is substantially perpendicular to the first rotation shaft $R_1$ (e.g., coupled by the second rotation shaft $R_2$), in order to facilitate the rotation.

In an embodiment, the camera assembly 410 may rotate about the second rotation shaft $R_2$ with respect to the second camera housing 450 and the connection member 470. For example, the connection member 470 may be coupled to the second camera housing 450 in a direction that is substantially perpendicular to the second rotation shaft $R_2$ (e.g., coupled by the first rotation shaft $R_1$. Thus, the camera assembly 410 may rotate separately with respect to the connection member 470.

In an embodiment, the first virtual line $C_1$ (as depicted in FIG. 9) from which the first rotation shaft $R_1$ extends may be defined. A first point $P_1$ that is farthest from the first virtual line $C_1$ among the third side surface 413-3 and the fourth side surface 413-4 may be defined. Here, the distance from the first virtual line $C_1$ to the first point $P_1$ may be defined as a first maximum rotation radius $D_1$ of the camera assembly.

In an embodiment, the second camera housing 450 may be provided so that the minimum distance from the first virtual line $C_1$ to the inner surface of the second camera housing 450 is longer than the first maximum rotation radius $D_1$.

In an embodiment, a second virtual line $C_2$ (as depicted in FIG. 9) from which the second rotation shaft $R_2$ extends may be defined. A second point $P_2$ farthest from the second virtual line $C_2$ among the first side surface 413-1 and the second side surface 413-2 may be defined. Here, the distance from the second virtual line $C_2$ to the second point $P_2$ may be defined as a second maximum rotation radius $D_2$ of the camera assembly 410.

In an embodiment, the second camera housing 450 may be provided so that the minimum distance from the second virtual line $C_2$ to the inner surface of the second camera housing 450 is longer than the second maximum rotation radius $D_2$.

Figure 11:
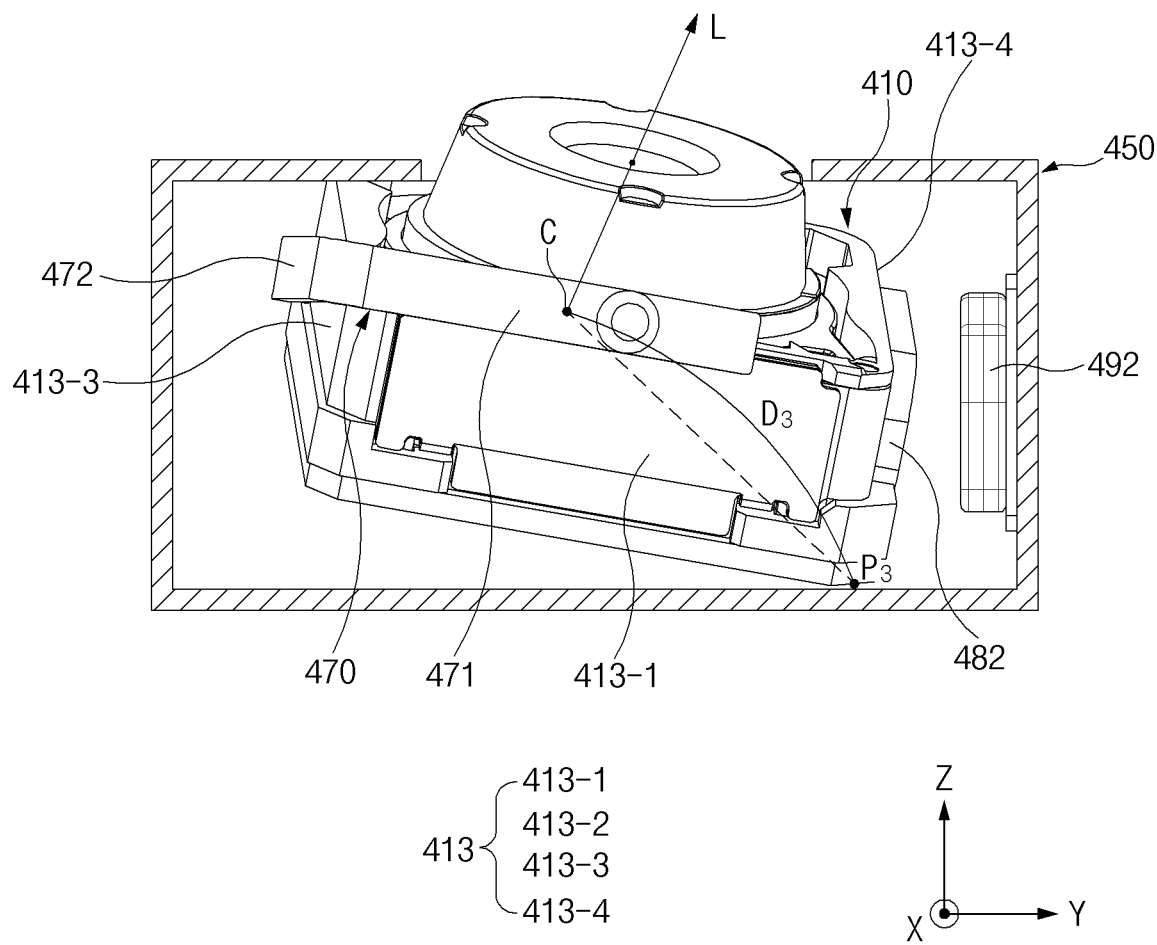
FIG. 11 is a view illustrating third rotation of a camera assembly of the camera module according to an embodiment.

FIG. 11 is a view illustrating third rotation of the camera assembly of the camera module according to an embodiment. FIG. 11 illustrates a camera assembly in which an upper frame (e.g., the upper frame 421 of FIG. 5) is omitted for clarity.

In an embodiment, the third rotation may refer to simultaneous execution of the first rotation (e.g., FIG. 10a) and the second rotation (e.g., FIG. 10b).

In an embodiment, the camera assembly 410 may rotate about the rotation center point C. The rotation center point C may be a virtual point defined by meeting the first virtual line $C_1$ and the second virtual line $C_2$ with each other. A third point $P_3$ that is farthest from the virtual rotation center point C among the side surfaces 413 of the camera assembly 410 may be defined.

In certain embodiments, the third point $P_3$ may be defined at a portion of the corner area 415. Here, the distance from the rotation center point C to the third point $P_3$ may be defined as a third maximum rotation radius $D_3$ of the camera assembly 410.

In an embodiment, the second camera housing 450 may be provided so that the minimum distance from the inner surface to the virtual center of rotation C is longer than the third maximum rotation radius $D_3$.

Referring to FIGS. 10 and 11, the second camera housing 450 of the camera module 400 may be disposed in consideration of the maximum rotation radius (e.g., $D_1$, $D_2$, and $D_3$) of the camera assembly 410. The second camera housing 450 may be provided to have a sufficient internal space so as not to collide with the camera assembly 410 during rotation of the camera assembly 410.

Figure 12:
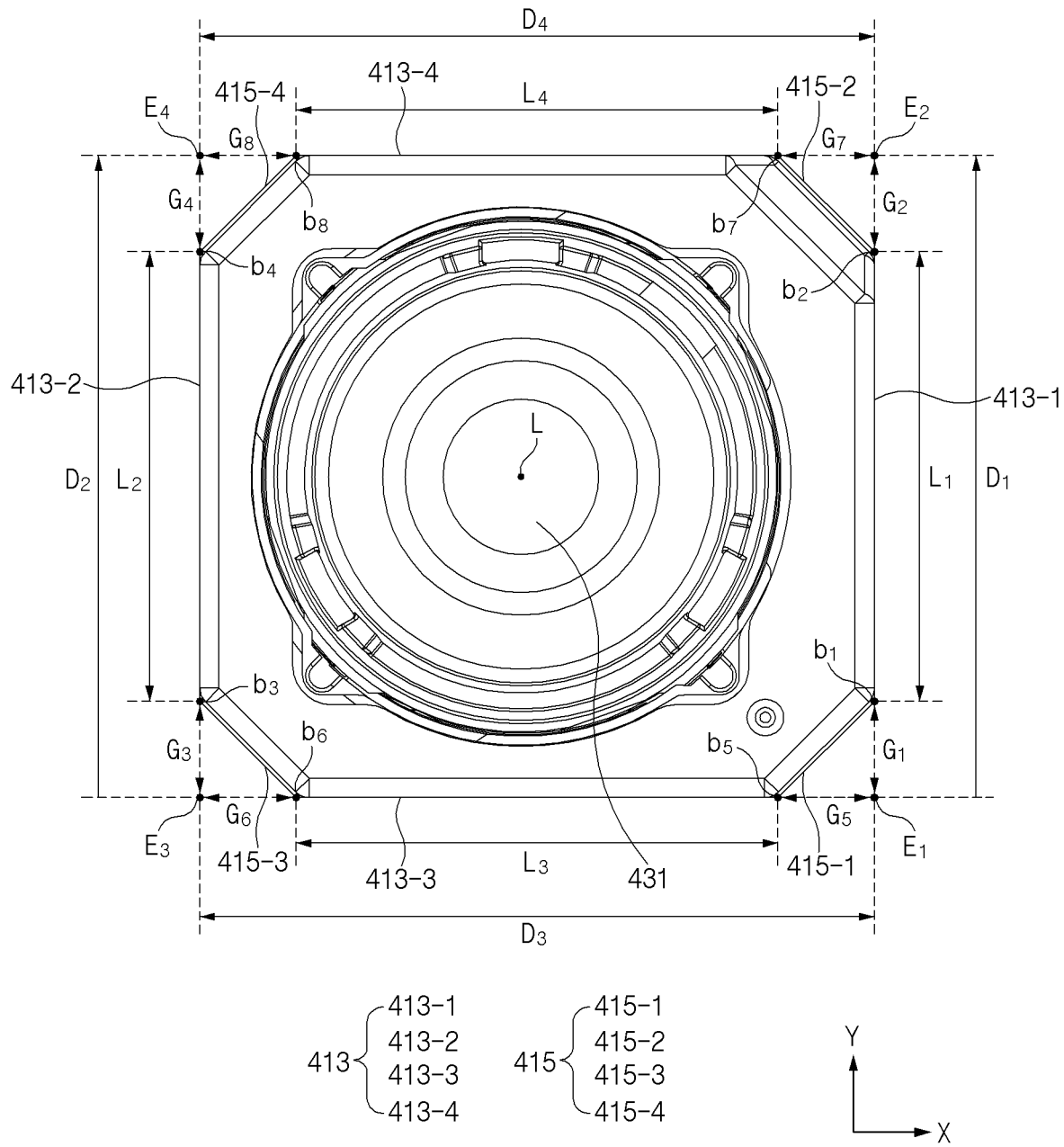
FIG. 12 is a view illustrating a corner area of a camera assembly of the camera module according to an embodiment.

FIG. 12 is a view illustrating the connection member of the camera module according to an embodiment.

In an embodiment, the camera assembly 410 may include a corner area 415 defined between adjacent side surfaces 413. In the illustrated embodiment, the corner area 415 may include a first corner area 415-1 defined between the first side surface 413-1 and the third side surface 413-3, a second corner area 415-2 defined between the first side surface 413-1 and the fourth side surface 413-4, a third corner area 415-3 defined between the second side surface 413-2 and the third side surface 413-3, and/or a fourth corner area 415-4 defined between the second side surface 413-2 and the fourth side surface 413-4.

Referring to FIG. 12, for example, the first corner area 415-1 may define a first corner $b_1$ together with the first side surface 413-1 and also define a fifth corner $b_5$ together with the third side surface 413-3. For example, the second corner area 415-2 may define a second corner $b_2$ together with the first side surface 413-1 and also define a seventh corner $b_7$ together with the fourth side surface 413-4. For example, the third corner area 415-3 may define a third corner $b_3$ together with the second side surface 413-2 and also define a sixth corner $b_6$ together with the third side surface 413-3. For example, the fourth corner area 415-4 may define a fourth corner $b_4$ together with the second side surface 413-2 and also define an eighth corner $b_8$ together with the fourth side surface 413-4. In another example, all or some of the first corner $b_1$ to the eighth corner $b_8$ may not be provided according to the shape of the first corner area 415-1, the second corner area 415-2, the third corner area 415-3, or the fourth corner area 415-4.

In an embodiment, the first corner area 415-1 may include a plane or a curved surface facing a direction different from each of the first side surfaces 413-1 and third side surfaces 413-3, which are adjacent to each other. For example, the first corner area 415-1 may include a plane facing a direction between the X-axis and the −Y-axis.

In an embodiment, the second corner area 415-2 may include a plane or a curved surface facing a direction different from each of the first side surfaces 413-1 and the fourth side surfaces 413-4, which are adjacent to each other. For example, the second corner area 415-2 may include a plane facing a direction between the X-axis and the Y-axis.

In an embodiment, the third corner area 415-3 may include a plane or a curved surface facing a direction different from each of the second side surfaces 413-2 and third side surfaces 413-3, which are adjacent to each other. For example, the third corner area 415-3 may include a plane facing a direction between the −X-axis and the −Y-axis.

In an embodiment, the fourth corner area 415-4 may include a plane or a curved surface facing different directions from the second side surface 413-2 and the fourth side surface 413-4, which are adjacent to each other. For example, the fourth corner area 415-4 may include a plane facing the −X-axis and Y-axis directions.

Referring to FIG. 12, a first virtual corner $E_1$ defined by meeting a virtual surface extending from the first side surface 413-1 and a virtual surface extending from the third side surface 413-3 may be defined. A second virtual corner $E_2$ defined by meeting the virtual surface extending from the first side surface 413-1 and a virtual surface extending from the fourth side surface 413-4 may be defined. A third virtual corner $E_3$ defined by meeting a virtual surface extending from the second side surface 413-2 and a virtual surface extending from the third side surface 413-3 may be defined.

A further virtual corner $E_4$ defined by meeting the virtual surface extending from the second side surface 413-2 and a virtual surface extending from the fourth side surface 413-4 may be defined.

Referring to FIG. 12, the first virtual corner $E_1$ may be disposed adjacent to the first corner area 415-1. The second virtual corner $E_2$ may be disposed adjacent to the second corner area 415-2. The third virtual corner $E_3$ may be disposed adjacent to the third corner area 415-3. The fourth virtual corner $E_4$ may be disposed adjacent to the fourth corner area 415-4.

Referring to FIG. 12, the first virtual corner $E_1$ and the second virtual corner $E_2$ may be spaced a first distance $D_1$ from each other. The first virtual corner $E_1$ and the third virtual corner $E_3$ may be spaced a third distance $D_3$ from each other. The second virtual corner $E_2$ and the fourth virtual corner $E_4$ may be spaced a fourth distance $D_4$ from each other. The third virtual corner $E_3$ and the fourth virtual corner $E_4$ may be spaced a second distance $D_2$ from each other.

In an embodiment, the camera assembly 410 may have a shape in which the corner portions including the virtual corners $E_1$, $E_2$, $E_3$, and $E_4$ are removed from a rectangular parallelepiped shape including the virtual corners $E_1$, $E_2$, $E_3$, and $E_4$, respectively. For example, the camera assembly 410 may be provided in an octagonal shape if viewed in the direction of the optical axis (e.g., the optical axis L of FIG. 13). For example, if the camera assembly 410 is viewed in the direction of the optical axis (e.g., the optical axis L of FIG. 13), each of the corners $b_1$, $b_2$, $b_3$, $b_4$, $b_5$, $b_6$, $b_7$, and $b_8$ of the corner areas may be spaced a predetermined gap from each of adjacent virtual corners $E_1$, $E_2$, $E_3$, and $E_4$.

For example, in the first corner area 415-1, the first corner $b_1$ may be spaced a first gap $G_1$ from the first virtual corner $E_1$ in the Y-axis direction, and the fifth corner $b_5$ may be spaced a fifth gap $G_5$ from the first virtual corner $E_1$ in the X-axis direction. In an embodiment, the first gap $G_1$ may be provided so that a ratio $$\frac{G_1}{D_1}$$

of the first gap $G_1$ to the first distance $D_1$ ranges of about 0.1 to about 0.5. In an embodiment, the first gap $G_5$ may be provided so that a ratio $$\frac{G_5}{D_3}$$

of the fifth gap $G_5$ to the third distance $D_3$ ranges of about 0.1 to about 0.5.

For example, in the second corner area 415-2, the second corner $b_2$ may be spaced a second gap $G_2$ from the second virtual corner $E_2$ in the Y-axis direction, and the seventh corner $b_7$ may be spaced a seventh gap $G_7$ from the second virtual corner $E_2$ in the X-axis direction. In an embodiment, the second gap $G_2$ may be provided so that a ratio $$\frac{G_2}{D_1}$$

of the second gap $G_2$ to the first distance $D_1$ ranges of about 0.1 to about 0.5. In an embodiment, the seventh gap $G_7$ may be provided so that a ratio $$\frac{G_7}{D_4}$$

or the seventh gap $G_7$ to the fourth distance $D_4$ ranges of about 0.1 to about 0.5.

For example, in the third corner area 415-3, the third corner $b_3$ may be spaced a third gap $G_3$ from the third virtual corner $E_3$ in the Y-axis direction, and the sixth corner $b_6$ may be spaced a sixth gap $G_6$ from the third virtual corner $E_3$ in the X-axis direction. In an embodiment, the third gap $G_3$ may be provided so that a ratio $$\frac{G_3}{D_2}$$

of the third gap $G_3$ to the second distance $D_2$ ranges of about 0.1 to about 0.5. In an embodiment, the sixth gap $G_6$ may be provided so that a ratio $$\frac{G_6}{D_3}$$

or the sixth gap $G_6$ to the third distance $D_3$ ranges of about 0.1 to about 0.5.

For example, in the fourth corner area 415-4, the fourth corner $b_4$ may be spaced a fourth gap $G_4$ from the fourth virtual corner $E_4$ in the Y-axis direction, and the eighth corner $b_8$ may be spaced an eighth gap $G_8$ from the fourth virtual corner $E_4$ in the X-axis direction. In an embodiment, the fourth gap $G_4$ may be provided so that a ratio $$\frac{G_4}{D_2}$$

of the fourth gap $G_4$ to the second distance $D_2$ ranges of about 0.1 to about 0.5. In an embodiment, the eighth gap $G_8$ may be provided so that a ratio $$\frac{G_8}{D_4}$$

of the eighth gap $G_8$ to the fourth distance $D_4$ ranges of about 0.1 to about 0.5.

As another example, the first corner area 415-1 may be spaced a predetermined gap from the first virtual corner $E_1$. The second corner area 415-2 may be spaced a predetermined gap from the second virtual corner $E_2$. The third corner area 415-3 may be spaced a predetermined gap from the third virtual corner $E_3$. The fourth corner area 415-4 may be spaced a predetermined gap from the first virtual corner $E_4$.

In certain embodiments, the first side surface 413-1 may have a first length $L_1$ in the Y-axis direction. For example, the first side surface 413-1 may have a first length L from the first corner $b_1$ to the second corner $b_2$. In certain embodiments, the ratio $$\frac{L_1}{D_1}$$

of the first length $L_1$ to the first distance $D_1$ may range of 0 to about 0.8.

In certain embodiments, the second side surface 413-2 may have a second length $L_2$ in the Y-axis direction. For example, the second side surface 413-2 may have a second length $L_2$ from the third corner $b_3$ to the fourth corner $b_4$. In certain embodiments, the ratio $$\frac{L_2}{D_2}$$

of the second length $L_2$ to the second distance $D_2$ may range of 0 to about 0.8.

In certain embodiments, the third side surface 413-3 may have a third length $L_3$ in the X-axis direction. For example, the third side surface 413-3 may have a third length $L_3$ from the fifth corner $b_5$ to the sixth corner $b_6$. In certain embodiments, the ratio $$\frac{L_3}{D_3}$$

of the fourth length $L_3$ to the third distance $D_3$ may range 0 to about 0.8.

In certain embodiments, the fourth side surface 413-4 may have a fourth length L in the X-axis direction. For example, the fourth side surface 413-4 may have a fourth length $L_4$ from the seventh corner $b_7$ to the eighth corner $b_8$. In certain embodiments, the ratio $$\frac{L_4}{D_4}$$

of the fourth length $L_4$ to the fourth distance $D_4$ may range of 0 to about 0.8.

In the shape of the camera assembly 410 according to an embodiment of the present disclosure, a space utilized by the rotation of the camera assembly 410 or a structure providing the space (e.g., the second camera housing 450 of FIG. 9) may be miniaturized. For example, since the corner area 415 having a relatively large rotation radius compared to the side surface 413 is disposed close to the rotation center point (disposed on the optical axis L in the drawing), the second camera housing 450 (e.g., the second camera housing 450 of FIG. 9) may be reduced in size. The shape of the camera assembly 410 according to an embodiment of the present disclosure may increase in rotation radius of the camera assembly 410.

According to certain embodiments, the first to fourth distance $D_1$ to $D_4$, the first to eighth gaps $G_1$ to $G_8$ and/or the first to fourth lengths $L_1$ to $L_4$ may be set in relation to the connection member (e.g., the connection member 470 of FIG. 8). For example, the distance and/or length may be changed according to the shape of the connection member (e.g., the connection member 470 of FIG. 8).

In some embodiments, the connection member (e.g., the connection member 470 of FIG. 8) may include a first portion extending along a first diagonal line (not shown) connecting the first virtual corner $E_1$ to the fourth virtual corner $E_4$ and a second portion extending along a second diagonal line (not shown) connecting the second virtual corner $E_2$ to the third virtual corner $E_3$.

Figure 13:
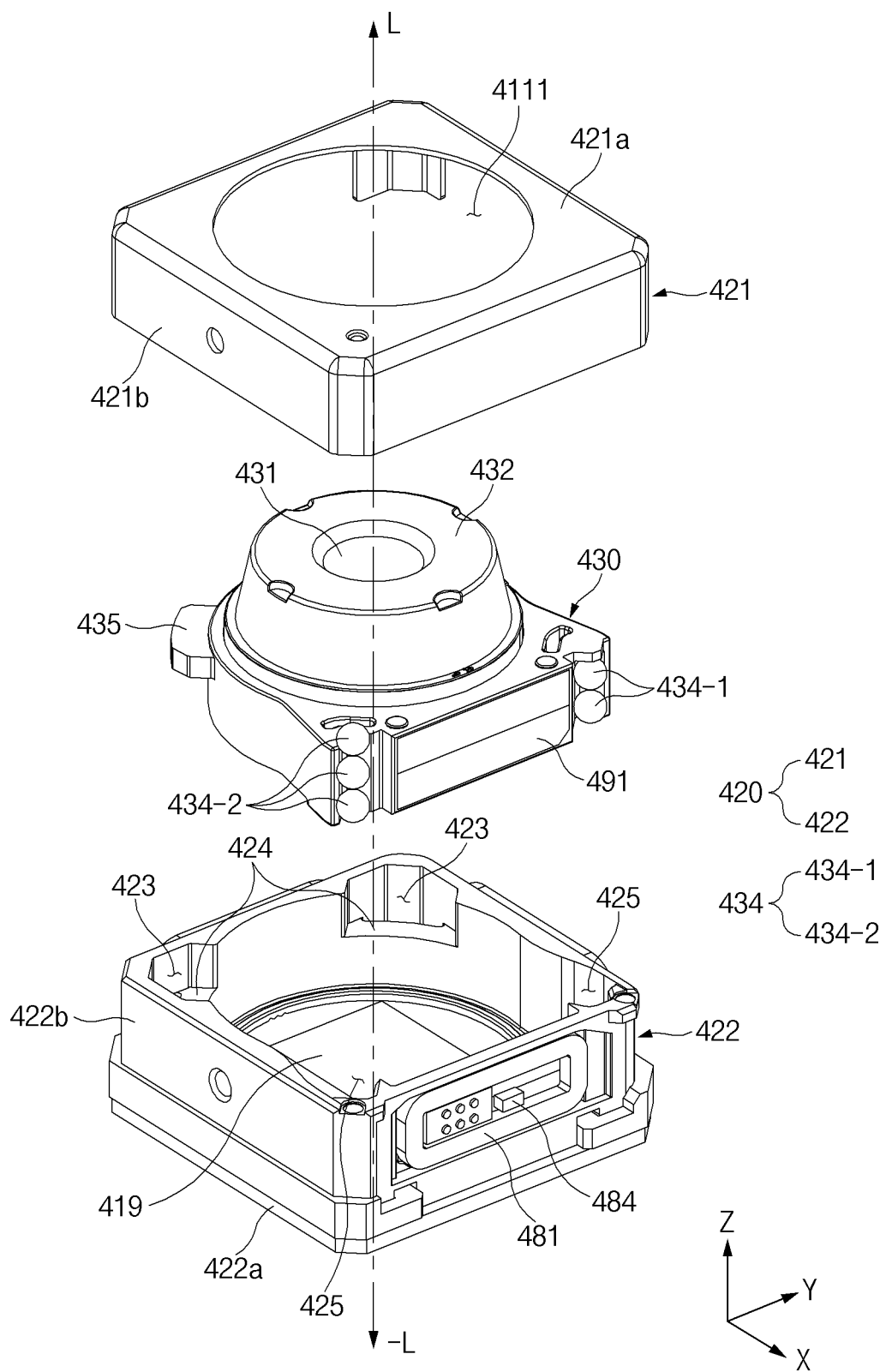
FIG. 13 is an exploded perspective view illustrating the camera assembly of the camera module according to an embodiment.

FIG. 13 is an exploded perspective view illustrating the camera assembly of the camera module according to an embodiment.

In an embodiment, the camera assembly 410 may include a lens carrier 430 including one or more lenses 431, an image sensor 419, and a first camera housing 420. For example, the first camera housing 420 may include an upper frame 421 and/or a lower frame 422, which surround at least a portion of the lens carrier 430.

For example, the upper frame 421 and the lower frame 422 may be coupled to define a space therein. At least a portion of the lens carrier 430 may be disposed in a space between the upper frame 421 and the lower frame 422.

In certain embodiments, the first camera housing 420 may define at least a portion of a surface (e.g., the top surface 411, the bottom surface 412, and the side surface 413 of FIGS. 6A-6B) of the camera assembly 410. For example, a first surface 421a of the upper frame 421 may define a top surface of the camera assembly 410 (e.g., the top surface 411 of FIGS. 6A-6B). A second surface 422a of the lower frame 422 may define bottom surface (e.g., the bottom surface 411 of FIGS. 6A-6B) of the camera assembly 410. A side surface 421b of the upper frame 421 and a side surface 422b of the lower frame 422 may define a side surface (e.g., the side surface 413 in FIGS. 6A-6B of the camera assembly 410.

In certain embodiments, a first opening 4111 may be defined in the first surface 421a of the upper frame 421. The image sensor 419 may be disposed on the second surface 422a of the lower frame 422.

In certain embodiments, the upper frame 421 and the lower frame 422 may be coupled so that the side surface 421b of the upper frame 421 and the side surface 422b of the lower frame 422 overlap each other.

In an embodiment, the image sensor 419 (e.g., the image sensor 230 of FIG. 2) may be configured to convert an optical signal incident from the lens 431 into an electrical signal. In an embodiment, the image sensor 419 may be disposed on the lower frame 422 of the camera assembly 410. For example, the image sensor 419 may be disposed in a direction facing the lens 431. If the camera assembly 410 rotates (e.g., FIGS. 10 and 11), the image sensor 419 may rotate together with the camera assembly 410. For example, if the camera assembly 410 rotates, a relative position of the image sensor 419 with respect to the lens 431 may be constantly maintained.

In an embodiment, the lens carrier 430 may include the lens barrel 432. The lens barrel 432 may be disposed to surround the lens 431. At least a portion of the lens barrel 432 may be aligned with the first opening 4111 so that external light is incident.

In certain embodiments, the lens carrier 430 may be configured to linearly move in the direction of the optical axis (L/−L) of the lens within the first camera housing 420. For example, if the lens carrier 430 moves in a +L axis direction, a distance between the lens 431 included in the lens carrier 430 and the image sensor 419 may increase. For example, if the lens carrier 430 moves in a −L axis direction, a distance between the lens 431 included in the lens carrier 430 and the image sensor 419 may decrease. Thus, a focal length of the camera module 400 may be compensated according to a distance from a component.

In certain embodiments, the lens carrier 430 may linearly move in the Z-axis direction in a basic state of the camera module 400. In certain embodiments, the lens carrier 430 may linearly move in the direction of the optical axis L of the lens 431, which is inclined at a predetermined angle with respect to the Z-axis while the camera module 400 rotates.

In an embodiment, the camera assembly 410 may further include a first coil 481 and/or a first magnetic body 491, which are related to the movement of the lens carrier 430 in the direction of the optical axis L.

In an embodiment, the first magnetic body 491 may be disposed on a side surface of the lens carrier 430. The first magnetic body 491 may face the first coil 481 disposed in the first camera housing 420. The first magnetic body 491 may electromagnetically interact with the first coil 481.

In an embodiment, the first coil 481 may be disposed on a side surface of the first camera housing 420. The first coil 481 may be disposed on an area facing the first magnetic body 491. For example, the first coil 481 may be disposed in an opening region defined in the side surface 422b of the lower frame 422.

In an embodiment, the camera assembly 410 may include a plurality of balls 434 disposed between the side surface of the lens carrier 430 and the first camera housing 420 and/or at least one recess 425 in which the plurality of balls 434 are accommodated. For example, the plurality of balls 434 may be disposed between the side surface of the first camera housing 420 and the side surface of the lens carrier 430. The plurality of balls 434 may provide rolling friction force between the lens carrier 430 and the first camera housing 420 if the lens carrier 430 moves in the direction of the optical axis L. In an embodiment, the recess 425 may be defined in the side of the lens carrier 430 and/or may be defined in the first camera housing 420. For example, the recess 425 may guide the plurality of balls 434 so that the balls 434 are rolled. In the illustrated embodiment, the plurality of balls 434 may include a plurality of first balls 434-1 disposed at one side of the first magnetic body 491 and a plurality of second balls 434-2 disposed on the other side of the third magnetic body 493. For example, the plurality of first balls 434-1 and/or the plurality of second balls 434-2 may be arranged in the direction of the optical axis L of the lens 431.

In an embodiment, the camera assembly 410 may include at least one guide member 435 protruding from the side surface of the lens carrier 430 and at least one guide rail 423 which is disposed in the first camera housing 420 and in which the at least one guide member 435 is accommodated. For example, the guide rail 423 may be disposed on the lower frame 422. The guide member 435 may be accommodated in the guide rail 423 in order to guide the lens carrier 430 to move (e.g., the L/−L direction) with respect to the optical axis L.

In an embodiment, the guide rail 423 may extend to be opened from a stepped surface 424 disposed on the side surface 422b of the lower frame 422 in the Z-axis direction (e.g., the direction of the optical axis L of the lens 431). If the lens carrier 430 moves in the −Z-axis direction or −L-axis direction, the stepped surface 424 may support the guide member 435 to limit a movement range of the lens carrier 430 in the −Z-axis direction or −L-axis direction.

In certain embodiments, the camera assembly 410 may include a control circuit (not shown) for controlling the first coil 481 and a first sensor 484. The control circuit (not shown) may control linear movement of the lens carrier 430 in the direction of the optical axis L based on a signal sensed from the first sensor 484. For example, the control circuit may detect the relative position of the first magnetic body 491 with respect to the first coil 481 through the first sensor 484, detect the lens carrier, in which the first magnetic body 491 is disposed, based on the relative position, and control current applied to the first coil 481 in order to reduce an offset between the detected position of the lens carrier 430 and a target position.

Figure 14:
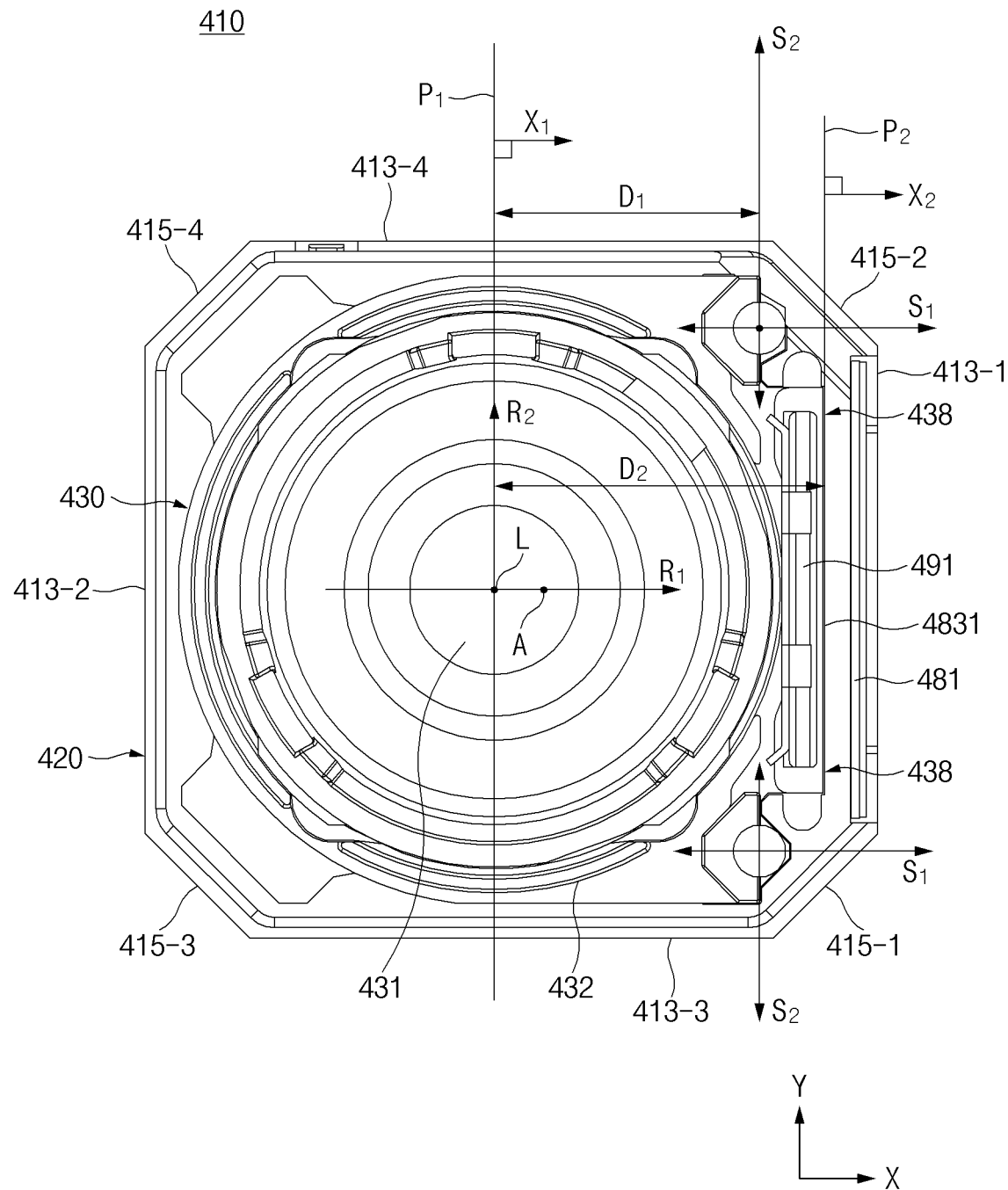
FIG. 14 is a plan view illustrating the camera assembly according to an embodiment.

FIG. 14 is a plan view illustrating the camera assembly according to an embodiment. FIG. 14 illustrates the camera assembly 410, from which the upper housing (e.g., the upper housing 421 of FIG. 13) is omitted, for helping to understand.

In an embodiment, the lens carrier 430 may include a protruding area 438 which faces the first side surface 413-1 of the camera assembly 410 and on which the first magnetic body 491 is disposed. Referring to FIG. 14, the protruding area 438 may be defined so that the first magnetic body 491 is at least partially aligned with the first coil 481. For example, the first coil 481 may be disposed on the first side surface 413-1 of the camera assembly 410. In an embodiment, the protruding area 438 may include an opposing surface 4831 facing the first side surface 413-1. For example, the opposing surface 4831 may include a plane facing the X-axis direction. For example, at least a portion of the opposing surface 4831 may be defined by at least a portion of the first magnetic body 491.

In an embodiment, the protruding area 438 of the lens carrier 430 may have one side (e.g., in the −Y-axis direction) at which the plurality of first balls 434-1 are disposed and the other side (e.g., in the Y-axis direction) at which the plurality of second balls 434-2 are disposed. The plurality of first balls 434-1 may be disposed adjacent to the second corner area 415-2. The plurality of second balls 434-2 may be disposed adjacent to the first corner area 415-1. A first magnetic body 491 may be disposed between the plurality of first balls 434-1 and the plurality of second balls 434-2.

Referring to FIG. 14, a first virtual plane $P_1$ including the optical axis L of the lens 431 may be defined. In the illustrated embodiment, the first virtual plane $P_1$ may face the X-axis direction (e.g., a direction in which the first rotation shaft $R_1$ of FIG. 9 is directed). For example, a normal vector X1 of the first virtual plane $P_1$ may be substantially parallel to the X-axis.

Referring to FIG. 14, a second virtual plane $P_2$ that includes at least a portion of the opposing surface 4831 of the protruding area 438 of the lens carrier 430 and is substantially parallel to the first virtual plane $P_1$ may be defined. For example, a normal vector X2 of the second virtual plane $P_2$ may be substantially parallel to the normal vector X1 of the first virtual plane $P_1$.

In an embodiment, the camera assembly 410 may be disposed so that the plurality of balls 434 are closer to the first virtual plane $P_1$ than at least a portion of the first magnetic body 491. For example, the plurality of balls 434 may be spaced a first distance $D_1$ from the first virtual plane $P_1$. As another example, the second virtual plane $P_2$ (or the protruding area) may be spaced apart by a second distance $D_2$ greater than the first distance $D_1$.

In an embodiment, the camera assembly 410 may be disposed so that a corner area adjacent to the plurality of balls 434 crosses the second virtual plane $P_2$. For example, the second virtual plane $P_2$ may be defined to pass between both corners of the corner area. For example, the first corner area 415-1 may be adjacent to the plurality of second balls 434-2, and the second virtual plane $P_2$ may extend between both the corners (e.g., the first corner $b_1$ and the fifth corner $b_5$) of the first corner area 415-1. For example, the second corner area 415-2 may be adjacent to the plurality of first balls 434-1, and the second virtual plane $P_2$ may extend between both the corners (e.g., the second corner $b_2$ and the seventh corner $b_7$) of the second corner area 415-2.

Referring to FIG. 14, a first virtual axis $S_1$ extending toward the X-axis/–X-axis from the plurality of balls 434 and a second virtual axis $S_2$ extending toward the Y-axis/–Y-axis from the plurality of balls 434 may be defined. For example, the first virtual axis $S_1$ and the second virtual axis $S_2$ may pass through centers of the plurality of balls 434.

In an embodiment, the camera assembly 410 may be provided so that at least one of the first virtual axis $S_1$ or the second virtual axis $S_2$ passes through the corner area. For example, the first virtual axis $S_1$ defined from the plurality of first balls 434-1 may pass through the second corner area 415-2 and the fourth corner area 415-4. For example, the first virtual axis $S_1$ defined from the plurality of second balls 434-2 may pass through the first corner area 415-1 and the third corner area 415-3.

In an embodiment, the camera assembly 410 may be provided so that the second virtual axis $S_2$ passes through the lens barrel 432 or is in contact with a surface of the lens barrel 432. For example, the second virtual axis $S_2$ connecting the plurality of first balls 434-1 to the plurality of second balls 434-2 may pass through at least a portion of the lens barrel 432.

In certain embodiments, a center point A of the camera assembly may not coincide with the optical axis of the lens. The center point A may represent a point at which a center line of the first side surface 413-1 and the second side surface 413-2 in the X-axis direction and a center line of the third side surface 413-3 and the fourth side surface 413-4 cross each other. Referring to the drawing, the optical axis L of the lens 431 may be disposed at a left side from the center point A. For example, a rotation center (e.g., a point disposed on the optical axis of the lens 431) of the camera assembly 410 may not coincide with a geometric center point A. As a result, the rotation radius of the camera assembly 410 may be different at one side and the other side based on the rotation shaft. For example, considering the second rotation shaft $R_2$ of the camera assembly 410, the rotation radius at the right side may be larger than that at the left side of the second rotation shaft $R_2$ based on the drawing.

In some embodiments, the corner area (e.g., the first corner area 415-1 and the second corner area 415-2) disposed at one side (e.g., the right side of the drawing) may have an area greater than that of the corner area (e.g., the third corner area 415-3 and the fourth corner area 415-4) disposed at the other side with respect to the rotation shaft (e.g., the second rotation shaft $R_2$). For example, the corner area having a relatively larger area may be corner areas (e.g., a first corner area 415-1 and a second corner area 415-2) adjacent to the plurality of balls 434. For example, referring to FIG. 12, each of the first to fourth gaps $G_1$ to $G_4$ may be larger than each of the fifth to eighth gaps $G_5$ to $G_8$.

In the shape of the camera assembly 410 according to an embodiment, a space utilized by the rotation of the camera assembly 410 or a structure providing the space (e.g., the second camera housing 450 of FIG. 9) may be miniaturized. For example, since the corner area 415 having a relatively large rotation radius compared to the side surface 413 is disposed close to the rotation center point (disposed on the optical axis L in the drawing), the second camera housing 450 (e.g., the second camera housing 450 of FIG. 9) may be reduced in size.

Figure 15A:
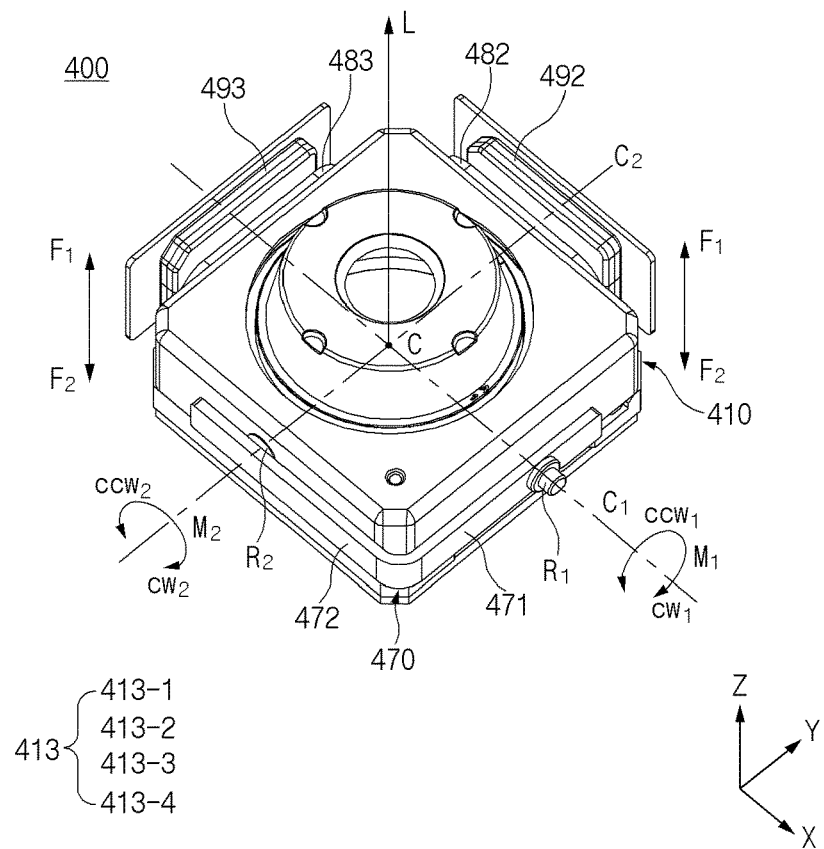
FIG. 15A and FIG. 15B are a view illustrating a coil and a magnetic body of the camera module according to an embodiment.
Figure 15B:
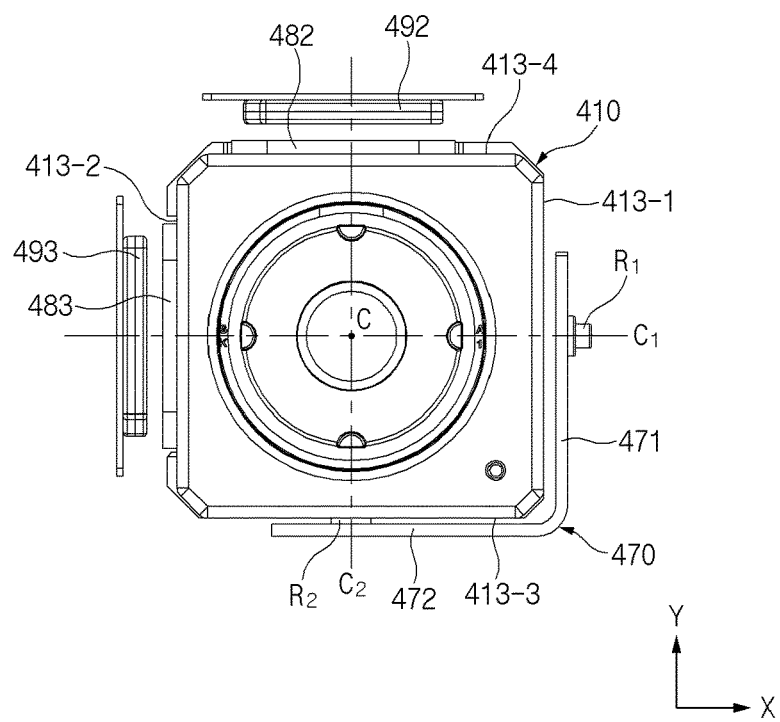

FIGS. 15A-15B are a view illustrating the coil and the magnetic body of the camera module according to an embodiment. FIG. 15a is a perspective view of the camera module, and FIG. 15B is a plan view of the camera module. FIGS. 15A-15B are a view illustrating a state in which the second camera housing is omitted in the camera module of FIG. 8.

In an embodiment, the camera module 400 may include a second coil 482, a second magnetic body 492 facing the second coil 482, a third coil 483, and a third magnetic body 493 facing the third coil 483.

In an embodiment, the second coil 482 and the third coil 483 may be disposed in the camera assembly 410, and the second magnetic body 492 and the third magnetic body 493 may be disposed in the second camera housing 450. In certain embodiments, the second coil 482 and the third coil 483 may be disposed in the second camera housing 450, and the second magnetic body 492 and the third magnetic body 493 may be disposed in the camera assembly 410.

In an embodiment, the second coil 482 may be disposed on the fourth side surface 413-4 of the camera assembly 410. The second magnetic body 492 may be disposed on an area of an inner surface of the second camera housing 450 facing the fourth side surface 413-4 of the camera assembly 410. The second coil 482 and the second magnetic body 492 may be configured to electromagnetically interact with each other. For example, the second coil 482 may be disposed in magnetic fields generated by the second magnetic body 492. For example, if current is applied to the second coil 482, predetermined magnetic force (e.g., Lorentz force) may be applied to the second coil 482.

In an embodiment, a rotation moment about the first rotation shaft $R_1$ may act on the camera assembly 410 of the camera module 400 by the predetermined magnetic force. For example, if magnetic force in an F1 direction is applied to the second coil 482, a rotation moment M in a counterclockwise direction CCW1 may act on the camera assembly 410 of the camera module 400. If magnetic force in the F2 direction is applied to the second coil 482, a rotation moment M1 in the clockwise direction CW1 may act on the camera assembly 410 of the camera module 400.

In certain embodiments, the second coil 482 may be disposed on a surface (e.g., the fourth side surface 413-4) facing a surface (e.g., the third side surface 413-3) of the side surfaces 413 of the image sensor 419 (e.g., a camera assembly), to which the second rotation shaft $R_2$ is coupled. In certain embodiments, the second coil 482 may be disposed on a surface (e.g., the fourth side surface 413-4) facing a surface (e.g., the third side surface 413-3) of the side surfaces 413 of the image sensor 419, which faces the second portion 472 of the connection member 470.

In an embodiment, the third coil 483 may be disposed on the second side surface 413-2 of the camera assembly 410. The third magnetic body 493 may be disposed on an area of an inner surface of the second camera housing 450 facing the second side surface 413-2 of the camera assembly 410. The third coil 483 and the third magnetic body 493 may be configured to electromagnetically interact with each other. For example, the third coil 483 may be disposed in magnetic fields generated by the third magnetic body 493. For example, if current is applied to the third coil 483, predetermined magnetic force (e.g., Lorentz force) may be applied to the third coil 483.

In an embodiment, a rotation moment about the second rotation shaft $R_2$ may act on the camera assembly 410 of the camera module 400 by the predetermined magnetic force. For example, if magnetic force in an F1 direction is applied to the third coil 483, a rotation moment M in a clockwise direction CW2 may act on the camera assembly 410 of the camera module 180. If magnetic force in the F2 direction is applied applied to the third coil 483, a rotation moment M2 in the counterclockwise direction CCW2 may act on the camera assembly 410 of the camera module 180.

In certain embodiments, the third coil 483 may be disposed on a surface (e.g., the second side surface 413-2) facing a surface (e.g., the first side surface 413-1) of the side surfaces 413 of the image sensor 419, to which the first rotation shaft $R_1$ is coupled. For example, the third coil 483 may be disposed on a surface (e.g., the second side surface 413-2) facing a surface (e.g., the first side surface 413-1) of the side surfaces 413 of the image sensor 419, which faces the first portion 471 of the connection member 470.

In an embodiment, the second coil 482 may be wound several times around the second rotation shaft $R_2$. The third coil 483 may be wound several times around the first rotation shaft $R_1$. For example, the second coil and the third coil may surround axes, which are substantially perpendicular to each other, several times.

In an embodiment, at least a partial area of the second magnetic body 492, which faces the second coil 482, and at least a partial area of the third magnetic body 493, which faces the third coil 483, face directions that are substantially perpendicular to each other. For example, the second magnetic body 492 may face the direction of the second rotation shaft $R_2$, and the third magnetic body 493 may face the direction of the first rotation shaft $R_1$.

Figure 16A:
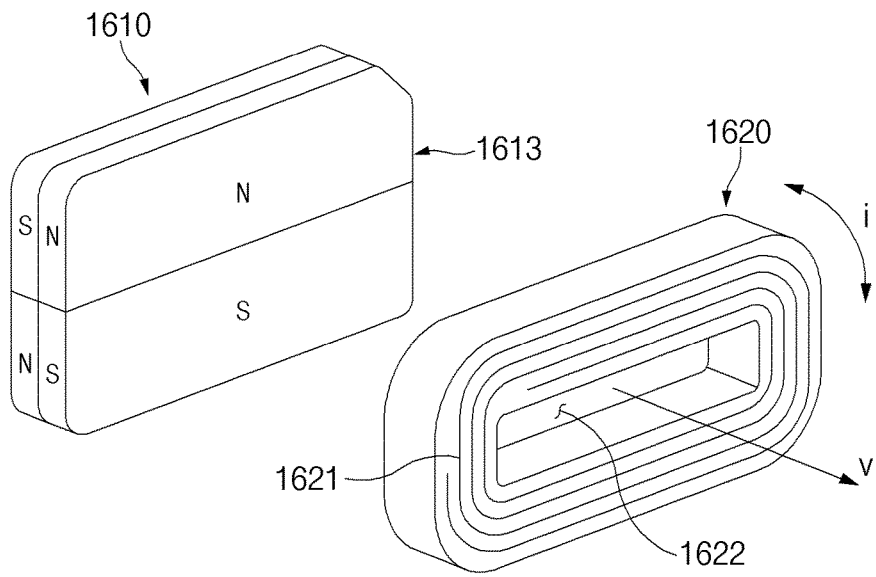
FIG. 16A, FIG. 16B and FIG. 16C are a view illustrating an arrangement of the coil and the magnetic body of the camera module according to an embodiment.
Figures 16B, 16C:
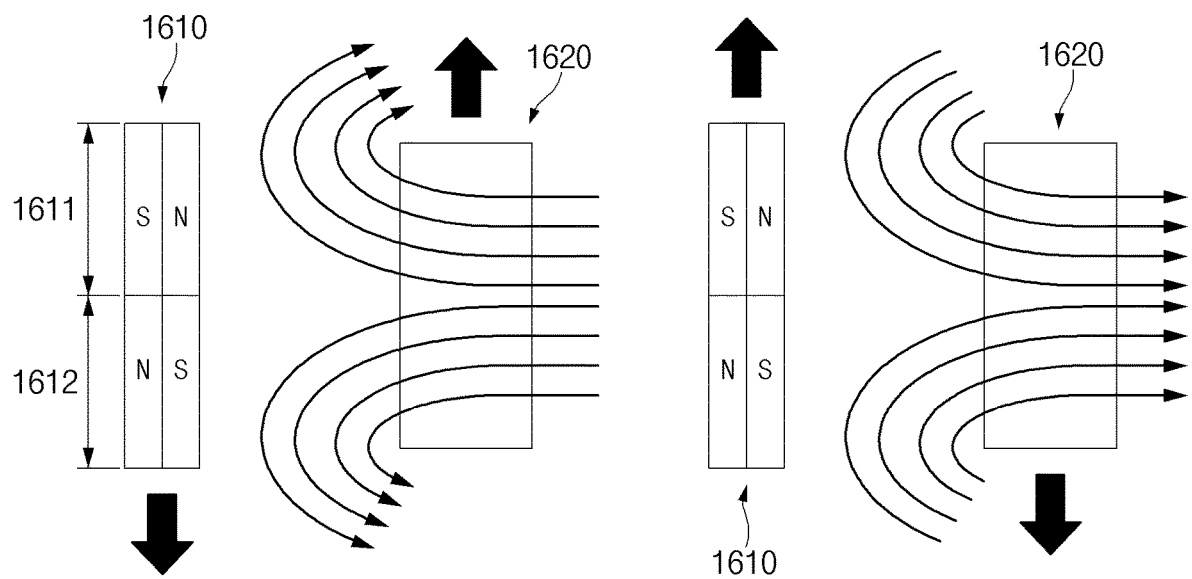

FIGS. 16A-16C are a view illustrating an arrangement of the coil and the magnetic body of the camera module according to an embodiment.

A magnetic body 1610 illustrated in FIGS. 16A-16C may include a first magnetic body 491, a second magnetic body 492, and/or a third magnetic body 493 illustrated in FIGS. 4 to 15.

A coil 1620 illustrated in FIGS. 16A-16C may include a first coil 481, a second coil 482, and/or a third coil 483 illustrated in FIGS. 4 to 15.

In an embodiment, the magnetic body 1610 and the coil 1620 may electromagnetically cross each other when current is applied to the coil 1620. The coil 1620 may be disposed at a position at which the coil 1620 is capable of interacting with magnetic fields generated by the magnetic body 1610.

In an embodiment, one of the magnetic body 1610 and the coil 1620 may be disposed on a fixed structure, and the other may be disposed on a movable structure that moves relative to the fixed structure.

For example, in the rotation of the camera assembly (e.g., the camera assembly 410 of FIG. 10), the magnetic body 1610 may be disposed in a housing (e.g., the second camera housing 450 of FIG. 10) that is a fixed structure, and the coil 1620 may be disposed in a camera assembly (e.g., the camera assembly 410 of FIG. 10), which is a rotatable structure that rotates with respect to the housing.

For example, in the linear movement of the lens carrier (e.g., the lens carrier 430 of FIG. 13), the coil 1620 may be disposed in a camera assembly (e.g., the first camera housing 420 of FIG. 13) which is a fixed structure, and the magnetic body 1610 may be disposed on a lens carrier (e.g., the lens carrier 430 of FIG. 13) that moves linearly with respect to the camera assembly.

Referring to FIG. 16A, the magnetic body 1610 may include a plurality of sub-magnetic bodies 1611 and 1612. For example, the magnetic body 1610 may include two sub-magnetic bodies 1611 and 1612.

In an embodiment, the magnetic body 1610 may include an opposing surface 1613 facing the coil 1620. In certain embodiments, the magnetic body 1610 may be disposed so that the opposing surface 1613 has at least two polarities.

For example, a portion of the opposing surface 1613 may have an N-pole, and the other portion of the opposing surface 1613 may have an S-pole. In an embodiment, the N and S poles may be disposed in a direction substantially parallel to a direction in which the N and S poles intend to move.

According to an embodiment, in the rotation of the camera assembly (e.g., the camera assembly 410 of FIG. 10), some (e.g., the first coil 481 and the second coil 482) of the plurality of coils (e.g., the first coil 481, the second coil 482, and the third coil) may be disposed on the fixed structure (for example, the second camera housing 450 in FIG. 10), and another coil (e.g., the third coil 483) may be disposed on the rotatable structure (e.g., the camera assembly 410 of FIG. 10). In addition, in relation to the arrangement of the plurality of coils, some (e.g., the first magnetic body 491 and the second magnetic body 492) of the plurality of magnetic bodies (e.g., the first magnetic body 491, the second magnetic body 492, and the third magnetic body 493) may be disposed on the rotatable structure (e.g., the camera assembly 410 of FIG. 10), and another magnetic body (e.g., the third magnetic body 493) may be disposed on the fixed structure (e.g., the second camera housing 450 of FIG. 10).

According to an embodiment, the plurality of coils and the plurality of magnetic bodies may be disposed based on a function (e.g., an auto focusing function, an image stabilization function) performed by the camera module. For example, some (e.g., the third coil 483) of the plurality of coils related to the auto-focus function and some (e.g., the third magnetic body 493) of the plurality of magnetic bodies may be disposed on the rotatable structure. In addition, other coils (e.g., the first coil 481 and the second coil 482) of the plurality of coils related to the image stabilization function may be disposed on the rotatable structure, and other magnetic bodies (e.g., the first magnetic body 491 and the second magnetic body 492) among the plurality of magnetic bodies may be disposed on the fixed structure.

Referring to FIG. 16A, the coil 1620 may be formed by winding a conductive wire 1621 several times. A vector v extending from the opposing surface 1613 of the magnetic body 1610 and passing through a region 1622 surrounded by the conducting wire 1621 may be defined. For example, the coil 1620 may be provided so that the conductive wire 1621 winds the vector v several times. Current in a clockwise or counterclockwise direction may flow around the vector v through the coil 1620. In certain embodiments, the second coil 482 illustrated in FIGS. 15A-15B may be provided to surround a virtual line $C_2$ in which the second rotation shaft $R_2$ extends. In certain embodiments, the third coil 483 illustrated in FIGS. 15A-15B may be provided to surround the virtual line $C_1$ in which the first rotation shaft $R_1$ extends.

Referring to FIG. 16B, current flowing in the clockwise direction may flow through the coil 1620. Magnetic force (e.g., Lorentz force) in an upward direction may be applied to the coil 1620 based on the drawing. Here, if the coil 1620 is disposed on the fixed structure, it may be understood that downward magnetic force is applied to the magnetic body 1610.

Referring to FIG. 16C, the current flowing in the counterclockwise direction may flow through the coil 1620. The magnetic force (e.g., Lorentz force) in the downward direction may be applied to the coil 1620 based on the drawing. Here, when the coil 1620 is disposed on the fixed structure, it may be understood that the upward magnetic force (Lorentz force) is applied to the magnetic body 1610.

However, the magnetic body and coil disclosed in the present disclosure are not necessarily limited to the form illustrated in FIGS. 16A-16C. For example, the magnetic body may have opposing surfaces having a single polarity.

However, the magnetic body disclosed in the present disclosure is not necessarily limited to the form illustrated in FIGS. 16A-16C. For example, the magnetic body may include one sub-magnetic body. For example, the magnetic body may be provided so that an N-pole sub-magnetic body defines a portion of the opposing surface, and an S-pole sub-magnetic body defines a remaining portion of the opposing surface.

Figure 17:
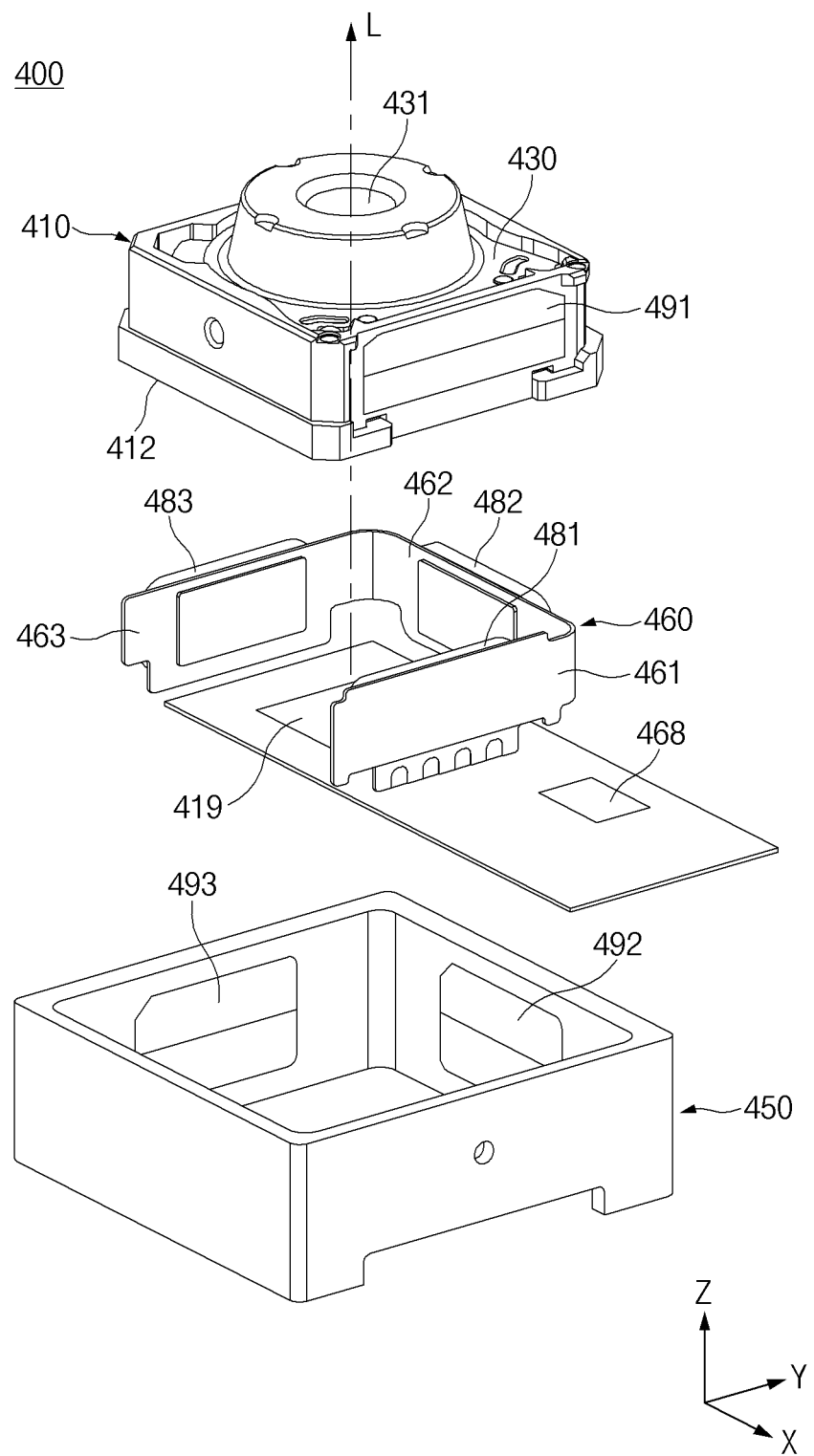
FIG. 17 is a view illustrating a camera module according to an embodiment.
Figure 18:
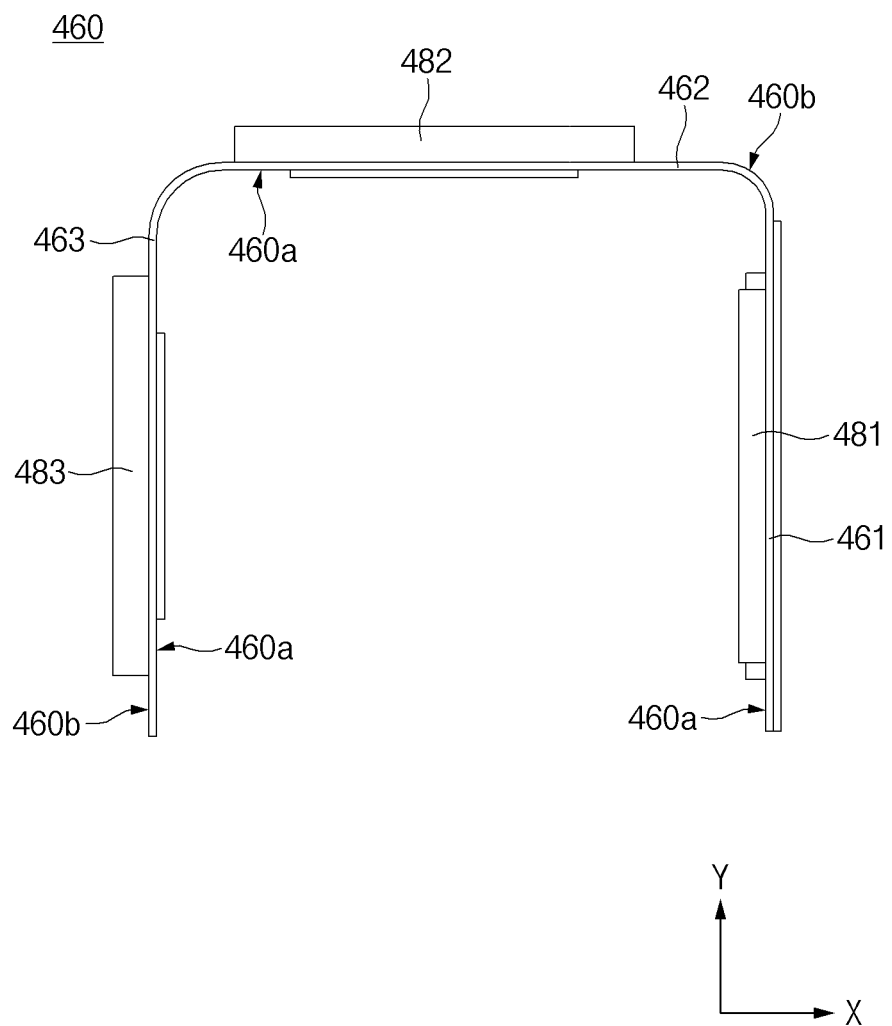
FIG. 18 is a view illustrating a PCB of the camera module.

FIG. 17 is a view illustrating a camera module according to an embodiment. FIG. 18 is a view illustrating a PCB of the camera module. FIG. 17 illustrates the camera assembly 410 from which the upper frame (e.g., the upper frame 421 of FIG. 13) is omitted for clarity.

In an embodiment, the camera module 400 may include a PCB 460 surrounding the camera assembly 410. For example, the PCB 460 may be coupled to a side surface (e.g., the side surface 413 of FIGS. 6A-6B) of the camera assembly 410. The PCB 460 may include an inner surface 460a facing the lens carrier 430 and an outer surface 460b facing the second camera housing 450.

In an embodiment, the second coil 482 and the third coil 483 may be disposed on the outer surface 460b of the PCB 460, and the first coil 481 may be disposed on the inner surface 460a of the PCB 460. The second coil 482 and the third coil 483 may be configured to interact with the second magnetic body 492 and the third magnetic body 493, respectively, and the first coil 481 may be configured to interact with the first magnetic body 491.

In an embodiment, the PCB 460 may include a second area 462 on which the second coil 482 is disposed, a third area 463 on which the third coil 483 is disposed, and a first area 461 on which the first coil 481 is disposed.

In an embodiment, the second area 462 may be provided between the third area 463 and the first area 461. The third area 463 and the first area 461 may be provided to face each other. In certain embodiments, the second area 462 may face a direction that is substantially perpendicular to a direction toward the third area 463 or the first area 461.

In an embodiment, the camera module 400 may further include a control circuit (not shown) configured to control the second coil 482, the third coil 483, and the first coil 481. The control circuit may control current flowing through the second coil 482 and the third coil 483 in order to allow the camera assembly 410 to rotate within a predetermined range. The control circuit may control the current flowing through the first coil 481 in order to allow the lens carrier 430 to linearly move. In certain embodiments, the control circuit may be mounted on the PCB 460.

In an embodiment, the control circuit may further include a hall sensor configured to sense magnetic fields. The control circuit may detect states of the lens carrier 430 and the camera assembly 410 through a signal sensed through the hall sensor. The signal sensed by the hall sensor may be fed back to a control circuit. Accordingly, the control circuit may control the camera assembly 410 or the lens carrier 430 based on the feedback signal. In certain embodiments, the hall sensor may be mounted on the PCB 460.

In certain embodiments, the hall sensor (not shown) may include a second hall sensor (e.g., the second sensor 485 and the third magnetic body 493 of FIGS. 6A-6B) for sensing relative positions of the second magnetic body 492 and the second coil 482, a third hall sensor (e.g., the third sensor 486 of FIGS. 6A-6B) for sensing relative positions of the third magnetic body 493 and the third coil 483, and a first hall sensor (e.g., the first sensor 484 of FIG. 13) for sensing relative positions of the first magnetic body 491 and the first coil 481.

In certain embodiments, an electronic device (e.g., the electronic device 101 of FIG. 1 and the electronic device 300 of FIG. 3) may include a camera module 400 and a control circuit for controlling the camera module 400. For example, the control circuit may include a processor (e.g., the processor 120 of FIG. 1) included in the electronic device (e.g., the electronic device 101 of FIG. 1). In certain embodiments, the control circuit may be disposed on the PCB 460 of the camera module 400 or may be disposed on a substrate of the electronic device.

In certain embodiments, the camera module 400 may include a driving circuit 468 (e.g., a coil driver and a controller) electrically connected to the control circuit in order to control the coils.

In certain embodiments, the driving circuit 468 may be controlled so that the driving circuit applies a predetermined electric signal to at least one of the first coil 481, the second coil 482, or the third coil 483.

In certain embodiments, the driving circuit 468 may be disposed on the PCB 460. For example, the driving circuit 468 may be disposed on at least one of a first area 461, a second area 462, or a third area 463. For example, the driving circuit 468 may be disposed in an extension portion 469 extending from at least one of the first area 461, the second area 462, or the third area 463. In certain embodiments, the driving circuit 468 may be disposed inside the camera module 400 or may be disposed outside the camera module 400. For example, the extension portion 469 may be an area (e.g., the extension portion 469 of FIG. 4) extending out of the second camera housing 450.

An electronic device 101 or 300 according to embodiments of the present disclosure may include: a housing 310 including a camera module 400 in which an optical axis L is disposed to face a first direction; and a camera assembly 410 including a second camera housing 450 disposed inside the housing 310 and a camera assembly 410 disposed inside the second camera housing 450, in which the camera assembly may include a first camera housing 420, a lens carrier which includes at least one lens 431 and of which at least a portion is disposed inside the first camera housing 420, and an image sensor 419 disposed inside the first camera housing 420, in which the first camera housing 420 may include a first surface, a second surface 412 facing the first surface 411, at least one side area 413 surrounding a space between the first surface 411 and the second surface 412, and at least one corner area 415, in which the at least one corner area 415 may have a surface having a predetermined surface area, in which the camera assembly 410 may rotate about a rotation center point C of the camera assembly 410 so that an optical axis L of the lens 431 is angled at a predetermined angle with respect to the first direction, in which the at least side area 413 may be spaced a first gap from an inner surface of the second camera housing 450, which face the at least one side area 413, and the at least one corner area 415 may be spaced a second gap greater than the first gap from the inner surface of the second camera housing 450.

In certain embodiments, the lens carrier 430 may be disposed to be movable to the optical axis L of the lens 431 so that a distance from the lens 431 to the image sensor 419 varies.

In certain embodiments, the camera assembly 410 may include a plurality of balls 434 disposed between the first camera housing 420 and the lens carrier 430, a first coil disposed in the first camera housing 420, and a first magnetic body 491 disposed in the lens carrier 430 and facing the first coil, in which the at least one corner area 415 may include a first corner area 415-1 and a second corner area 415-2, which are adjacent to the plurality of balls, in which the at least one side area 413 may include a first side area 413-1 which is disposed between the first corner area 415-1 and the second corner area 415-2 and on which the first coil 481 is disposed.

In certain embodiments, the at least one side area 413 may be disposed at a position spaced a first distance from the rotation center point, and the at least one corner area 415 coupled or extending to the at least one side area 413 may be disposed at a position spaced a second distance equal to or greater than the first distance from the rotation center point.

In certain embodiments, the camera assembly 410 may include a first rotation shaft $R_1$ that is substantially perpendicular to the optical axis L of the lens 431 and extends in a second direction and a second rotation shaft $R_2$ extending in a third direction that is substantially perpendicular to the second direction, in which the rotation center point is defined as a point at which the first rotation shaft $R_1$, the second rotation shaft $R_2$, and the optical axis L of the lens 431 cross each other, in which the least one side area may include a first side area 413-1 and a second side surface 413-2 through which a first virtual line $C_1$ extending from the first rotation shaft $R_1$ and a second virtual line $C_2$ extending from the second rotation shaft $R_2$ pass, in which the at least one corner area is defined between the first side area 413-1 and the second side area 413-2.

In certain embodiments, the at least one side area 413 may include a first side area 413-1, a second side area 413-2 facing the first side area 413-1, a third side area 413-3 defined between the first side area 413-1 and the second side area 413-2, and a fourth side area 413-4 facing the third side area 413-3, in which the least one corner area may include a first corner area 415-1 defined between the first side area 413-1 and the third side area 413-3, a second corner area 415-2 defined between the first side area 413-1 and the fourth side area 413-4, a third corner area 415-3 defined between the second side area 413-2 and the third side area 413-3, and a fourth corner area 415-4 defined between the second side area 413-2 and the fourth side area 413-4, in which a virtual corner defined by a virtual side surface extending from one of the at least one side area and a virtual side surface extending from another side area adjacent to the virtual side surface is defined, in which the virtual corner may include a first virtual corner $E_1$ adjacent to the first corner area 415-1, a second virtual corner $E_2$ adjacent to the second corner area 415-2, a third virtual corner $E_3$ adjacent to the third corner area 415-3, and a fourth virtual corner $E_4$ adjacent to the fourth corner area 415-4.

In certain embodiments, the first virtual corner $E_1$ may be spaced a first distance $D_1$ from the second virtual corner $E_2$, in which the first side area 413-1 is defined so that a first corner $b_1$ defined together with the first corner area is spaced a first gap $G_1$ from the first virtual corner $E_1$, and a second corner $b_2$ defined together with the second corner area 415-2 is spaced a second gap $G_2$ from the second virtual corner $E_2$, in which a ratio $$\frac{G_1}{D_1}$$

of the first gap $G_1$ to the first distance $D_1$ and a ratio $$\frac{G_2}{D_1}$$

of the second gap $G_2$ to the first distance $D_1$ may range of 0.1 to 0.5.

In certain embodiments, the first virtual corner $E_1$ may be spaced a third distance $D_3$ from the third virtual corner $E_3$, in which the third side area 413-3 is defined so that a fifth corner $b_5$ defined together with the first corner area is spaced a fifth gap $G_5$ from the first virtual corner $E_1$, and a sixth corner $b_6$ defined together with the third corner area 415-3 is spaced a sixth gap $G_6$ from the third virtual corner $E_3$, in which a ratio $$\frac{G_5}{D_3}$$

of the fifth gap $G_5$ to the third distance $D_3$ and a ratio $$\frac{G_6}{D_3}$$

of the sixth gap $G_6$ to the third distance $D_3$ may range of 0.1 to 0.5.

In certain embodiments, in the side area 413, a length between a pair of corners defined together with two adjacent corner areas may be defined as a first length $L_1$, in which two virtual corners that are respectively adjacent to the two corner areas are spaced a first distance $D_1$ from each other, in which a ratio $$\frac{L_1}{D_1}$$

of the first length $L_1$ to the first distance $D_1$ may range of 0 to 0.8.

In certain embodiments, a virtual plane including the optical axis L of the lens 431 and parallel to the first side area 413-1 may be defined, in which each of the plurality of balls may be disposed at a position that is spaced a first distance from the virtual plane, in which at least a portion of the first magnetic body 491 may be disposed at a position that is spaced a second distance greater than the first distance from the virtual plane.

In certain embodiments, the at least one corner area 415 may further include a fourth corner area 415-4 disposed in an extension line passing through the optical axis L of the lens 431 from the first corner area 415-1 and a third corner area 415-3 disposed in an extension line passing through the optical axis L of the lens 431 from the second corner area 415-2, in which the first corner area 415-1 or the second corner area 415-2 may be defined at a position that is spaced a first distance from the rotation center point C, in which the third corner area 415-3 or the fourth corner area 415-4 may be defined at a position that is spaced a second distance less than the first distance from the rotation center point.

In certain embodiments, the first corner area 415-1 or the second corner area 415-2 may have a surface area greater than that of the third corner area 415-3 or the fourth corner area 415-4.

In certain embodiments, a first virtual axis $S_1$ extending in a direction parallel to a direction, in which the first side area 413-1 is directed, from the plurality of balls and a second virtual axis $S_2$ extending from the plurality of balls and substantially perpendicular to the first virtual axis $S_1$ may be defined, in which at least one of the first virtual axis $S_1$ and the second virtual axis $S_2$ may pass through the first corner area 415-1 or the second corner area 415-2.

In certain embodiments, the lens carrier 430 may further include a lens barrel 432 which surrounds the lens 431 and of which at least a portion is disposed between the lens and the first magnetic body 491, in which the plurality of balls 434 may include a plurality of first balls 434-1 disposed at one side with respect to the first magnetic body 491 and adjacent to the second corner area 415-2 and a plurality of second balls 434-2 disposed at the other side with respect to the first magnetic body 491 and adjacent to the first corner area 415-1, in which the plurality of balls 434 may be disposed so that a virtual line connecting the plurality of first balls 434-1 to the plurality of second balls 434-2 passes through at least a portion of the lens barrel 432.

A portable communication device 100 or 300 according to embodiments of the present disclosure may include: a camera assembly 410 including a lens and an image sensor; a camera housing 310 in which at least a portion of the camera assembly 410 is accommodated; a printed circuit board (PCB) surrounding at least a portion of the camera assembly 410; a plurality of coils electrically connected to the PCB 460, in which the plurality of coils include a first coil 481 disposed on a first area 461 of the PCB 460, a second coil 482 disposed on a second area 462 of the PCB, and a third coil 483 disposed on a third area of the PCB 460; and a plurality of magnetic bodies 491, 492, and 493 configured to electromagnetically interact with the plurality of coils 481, 482, and 483, in which the plurality of magnetic bodies 491, 492, and 493 include a first magnetic body 491 disposed inside the camera assembly 410 and facing the first area 461, a second magnetic body 492 defining an inner surface of the camera housing 310 and facing the second area 462, and a third magnetic body 493 defining the inner surface of the camera housing 310 and facing the third area 463, in which the camera assembly 410 may include a fourth side area 413-4 substantially facing the second magnetic body, a third side area 413-3 facing the fourth side area 413-4, a second side area 413-2 substantially facing the third magnetic body, a first side area 413-1 facing the second side area 413-2, a first corner area 415-1 defined between the first side area 413-1 and the second side area 413-2, and a second corner area 415-2 defined between the first side area 413-1 and the fourth side area 413-4, in which a first virtual corner $E_1$ defined by crossing a virtual side surface extending from the first side area with a virtual side surface extending from the third side area 413-3 and a second virtual corner $E_2$ defined by crossing a virtual side surface extending from the first side area with a virtual area extending from the fourth side area 413-4 may be defined, in which the first side area 413-1 may define a first corner $b_1$ together with the first corner area 415-1, the first side area 413-1 may define a second corner $b_2$ together with the second corner area 415-2, the first virtual corner $E_1$ and the second virtual corner $E_2$ may be spaced a first distance from each other, the first virtual corner $E_1$ and the first corner $b_1$ may be spaced a first gap from each other, the second virtual corner $E_2$ and the second corner $b_2$ may be spaced a second gap from each other, and at least one of a first ratio of the first gap to the first distance and a second ratio of the second gap to the first distance may range of 0.1 to 0.5.

In certain embodiments, the portable communication device may further include a control circuit electrically connected to the PCB 460, the first coil 481, the second coil 482, and the third coil 483, in which the control circuit may be set in order to perform a first function related to the camera assembly 410 by moving the camera assembly 410 by using the first coil 481 in a direction substantially parallel to the optical axis L of the lens 431 and perform a second function related to the camera assembly 410 by rotating the camera assembly 410 about at least one rotation shaft, which is substantially perpendicular to the optical axis L, by using at least one of the second coil 482 or the third coil 483, in which the first function may include an auto focusing function, and the second function may include an image stabilization function.

A camera module according to embodiments of the present disclosure may include: a camera assembly including a first camera housing 420, a lens 431 exposed through a surface of the first camera housing 420, and an image sensor 419 disposed inside the first camera housing 420; a second camera housing 450 in which at least a portion of the camera assembly 410 is accommodated, in which the camera assembly 410 may be coupled to the inside of the second camera housing 450 to be rotatable about each of a first rotation shaft $R_1$ substantially perpendicular to a direction of an optical axis L of the lens 431 and a second rotation shaft $R_2$ substantially perpendicular to each of the direction of the optical axis L of the lens 431 and the first rotation shaft $R_1$, in which the first camera housing 420 may include first side surfaces 413-1 and 413-2 facing a first direction that is an extension direction of the first rotation shaft $R_1$, second side surfaces 413-3 and 413-4 facing a second direction that is an extension direction of the second rotation shaft $R_2$, and a corner area 415 defined between the first side surfaces 413-1 and 413-2 and the second side surfaces 413-3 and 413-4 and facing a direction different from each of the first direction and the second direction; and in which the corner area 415 may include first corners $b_1$, $b_2$, $b_3$, and $b_4$ defined together with the first side surfaces 413-1 and 413-2 and second corners $b_5$, $b_6$, $b_7$, and $b_8$ defined together with the second side surfaces 413-3 and 413-4, in which a first virtual side surface from which the first side surface extends in the second direction, a second virtual side surface from which the second side surface extends in the first direction, and virtual corners $E_1$, $E_2$, $E_3$, and $E_4$ defined by the first virtual side surface and the second virtual side surface may be defined, in which any one $E_1$ or $E_3$ of the virtual corners may be spaced a first distance from the other $E_2$ or $E_4$ disposed in the second direction and be spaced a second distance from the other disposed in the first direction, each of the first corners $b_1$, $b_2$, $b_3$, and $b_4$ may be spaced a first gap from the virtual corner in the second direction, the second corner may be spaced a second gap from the virtual corner in the first direction, and at least one of a ratio of the first gap to the first distance and a ratio of the second gap to the second distance may range of 0.1 to 0.5.

In certain embodiments, in the first side surfaces 413-1 and 413-2, a distance between the first corners $b_1$, $b_2$, $b_3$, and $b_4$ may be defined as a first length, and in the first side surfaces 413-1 and 413-2, a ratio of the first length to the first distance may range of 0 to 0.8.

In certain embodiments, in the second side surfaces 413-3 and 413-4, a distance between the second corners $b_5$, $b_6$, $b_7$, and $b_8$ may be defined as a second length, and in the second side surfaces 413-3 and 413-4, a ratio of the second length to the second distance may range of 0 to 0.8.

In certain embodiments, the camera module may further include a connection member 470 disposed between the first camera housing 420 and the second camera housing 450 so that the camera assembly 410 is rotatably coupled to the second camera housing 450, in which the connection member 470 may include a first portion 471 rotatably coupled to the camera assembly 410 and a second portion 472 rotatably coupled to the second camera housing 450, in which the first portion 471 may include a first protrusion 474 accommodated in a first hole 4131 defined in the first camera housing 420 and protruding toward the first rotation shaft $R_1$, and the second portion may include a second protrusion 475 accommodated in a second hole 4531 defined in the second camera housing 450 and protruding toward the second rotation shaft $R_2$.

The camera module and the electronic device including the same according to the embodiments disclosed in the present document may provide an auto focusing function and an image stabilization function. Regarding the auto focusing function, the electronic device and the camera module may be changed in distance between the lens and the image sensor by moving the lens in the optical axis direction. Regarding the image stabilization function, the electronic device and/or the camera module may be configured to rotate the lens together with the image sensor.

In addition, the various effects that are directly or indirectly identified through the present disclosure may be provided.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with" or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. In which, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

What is claimed is:
1. An electronic device, comprising:
   a housing including a camera area facing a first direction; and
   a camera module disposed inside the housing in order to receive light through the camera area, the camera module including:
   a first camera housing,
   a camera assembly disposed inside the first camera housing, the camera assembly including a second camera housing, a lens carrier having at least one lens at least partially disposed inside the second camera housing, and an image sensor disposed inside the second camera housing, wherein the second camera housing includes a first surface, a second surface facing the first surface, at least one side area surrounding a space defined between the first surface and the second surface, and at least one corner area having a surface of a predetermined surface area, wherein the camera assembly is supported within the first camera housing by a connection member including two rotation shafts, and the camera assembly is rotatably connected about the two rotation shafts to the first camera housing via the connection member, so that an optical axis of the lens is angled at a predetermined angle with respect to the first direction, wherein the lens carrier is linearly movable along the optical axis direction inside the second camera housing, so that a distance between the lens and the image sensor is variable, and wherein the at least one side area of the camera assembly is spaced by a first gap from an inner surface of the first camera housing facing the at least one side area, and the at least one corner area of the camera assembly is spaced by a second gap greater than the first gap from the inner surface of the first camera housing, wherein the connection member is disposed between the first camera housing and the second camera housing, wherein the two rotation shafts include a first shaft extending in a first axis direction and a second shaft extending in a second axis direction substantially perpendicular to the first axis direction, and wherein a first end of the connection member is rotatably connected via the first shaft of the two rotation shafts to the first camera housing and a second end of the connection member is rotatably connected via the second shaft of the two rotation shafts to the second camera housing.

2. The electronic device of claim 1, wherein the camera assembly includes:
   a plurality of balls disposed between the second camera housing and the lens carrier,
   a first coil disposed in the second camera housing, and
   a first magnetic body disposed in the lens carrier and oriented facing the first coil,
   wherein the at least one corner area includes a first corner area and a second corner area adjacent to the plurality of balls, and
   wherein the at least one side area includes a first side area on which the first coil is disposed, the first side area disposed between the first corner area and the second corner area.

3. The electronic device of claim 1, wherein the at least one side area is spaced a first distance away from a rotation center point, and the at least one corner area coupled to or extending to the at least one side area is spaced a second distance away from the rotation center point, wherein the second distance is equal to or greater than the first distance.

4. The electronic device of claim 1, wherein the camera assembly includes a first rotation shaft disposed substantially perpendicular to the optical axis of the lens and extends in a second direction, and a second rotation shaft extending in a third direction substantially perpendicular to the second direction,
   wherein the first rotation shaft, the second rotation shaft, and the optical axis of the lens cross each other at a rotation center point,
   wherein the least one side area includes a first side area and a second side surface, through which a first virtual line extending from the first rotation shaft and a second virtual line extending from the second rotation shaft both pass, and
   wherein the at least one corner area is formed between the first side area and the second side area.

5. The electronic device of claim 1, wherein the at least one side area includes a first side area, a second side area facing the first side area, a third side area disposed between the first side area and the second side area, and a fourth side area facing the third side area,
   wherein the at least one corner area includes a first corner area formed between the first side area and the third side area, a second corner area formed between the first side area and the fourth side area, a third corner area formed between the second side area and the third side area, and a fourth corner area formed between the second side area and the fourth side area,
   wherein a virtual corner is defined by a virtual side surface extending from one of the at least one side area and a virtual side surface extending from another side area adjacent to the virtual side surface, and
   wherein the virtual corner includes a first virtual corner adjacent to the first corner area, a second virtual corner adjacent to the second corner area, a third virtual corner adjacent to the third corner area, and a fourth virtual corner adjacent to the fourth corner area.

6. The electronic device of claim 5, wherein the first virtual corner is spaced by a first distance away from the second virtual corner,
   wherein a first corner defined together with the first corner area is spaced by a first gap away from the first virtual corner, and a second corner defined together with the second corner area is spaced by a second gap away from the second virtual corner, and
   wherein a ratio $$\frac{G_1}{D_1}$$

of the first gap to the first distance and a ratio $$\frac{G_2}{D_1}$$

of the second gap to the first distance ranges from 0.1 to 0.5.

7. The electronic device of claim 5, wherein the first virtual corner is spaced by a third distance away from the third virtual corner, and
   wherein the third side area is defined so that a fifth corner defined together with the first corner area is spaced by a fifth gap away from the first virtual corner, and a sixth corner defined together with the third corner area is spaced by a sixth gap away from the third virtual corner, and
   wherein a ratio $$\frac{G_5}{D_3}$$

of the fifth gap to the third distance and a ratio $$\frac{G_5}{D_3}$$

of the sixth gap to me third distance ranges from 0.1 to 0.5.

8. The electronic device of claim 5, wherein in the side area, a length between a pair of corners defined together with two adjacent corner areas is defined as a first length,
wherein two virtual corners that are respectively adjacent to the two corner areas are spaced by a first distance away from each other, and
wherein a ratio $$\frac{L_1}{D_1}$$

of the first length to the first distance ranges from 0 to 0.8.

9. The electronic device of claim 2, wherein a virtual plane is defined including a length of the optical axis parallel to the first side area,
wherein each of the plurality of balls is spaced by a first distance away from the virtual plane, and
wherein at least a portion of the first magnetic body is spaced by a second distance greater than the first distance away from the virtual plane.

10. The electronic device of claim 2, wherein the at least one corner area further comprises: a fourth corner area disposed on a first extension line passing through the optical axis of the lens from the first corner area, and a third corner area disposed on a second extension line passing through the optical axis of the lens from the second corner area,
wherein the first corner area or the second corner area is spaced by a first distance away from a rotation center point, and
wherein the third corner area or the fourth corner area is spaced by a second distance less than the first distance away from the rotation center point.

11. The electronic device of claim 10, wherein at least one of the first corner area and the second corner area has a surface area greater than at least one of the third corner area and the fourth corner area.

12. The electronic device of claim 2, wherein a first virtual axis extends from the plurality of balls, parallel to an orientation of the first side area,
wherein a second virtual axis extends from the plurality of balls and is substantially perpendicular to the first virtual axis, and
wherein at least one of the first virtual axis and the second virtual axis pass through the first corner area or the second corner area.

13. The electronic device of claim 2, wherein the lens carrier further includes a lens barrel surrounding the lens, at least a portion of the lens carrier being disposed between the lens and the first magnetic body,
wherein the plurality of balls includes a first set of balls disposed at one side of the first magnetic body adjacent to the second corner area, and a second set of balls disposed on another side of the first magnetic body adjacent to the first corner area, and
wherein a virtual line connecting the first set of balls to the second set of balls passes through at least a portion of the lens barrel.

14. A camera module, comprising:
a camera assembly including a first camera housing, a lens visible through a surface of the first camera housing, and an image sensor disposed within the first camera housing;
a second camera housing, in which at least a portion of the camera assembly is disposed; and
a connection member disposed between the first camera housing and the second camera housing, in which the camera assembly is rotatably coupled to the second camera housing, wherein the connection member includes a first portion rotatably coupled to the camera assembly and a second portion rotatably coupled to the second camera housing,
wherein the camera assembly is coupled to an interior of the second camera housing and rotatable about a first rotation shaft disposed substantially perpendicular to a direction of an optical axis of the lens, and about a second rotation shaft substantially perpendicular to the optical axis of the lens and the first rotation shaft,
wherein the first camera housing includes first side surfaces facing a first direction in which the first rotation shaft extends, second side surfaces facing a second direction that in which the second rotation shaft extends, and a corner area formed between the first side surfaces and the second side surfaces and facing a third direction different from the first direction and the second direction; and
wherein the corner area includes first corners defined together with the first side surfaces and second corners defined together with the second side surfaces,
wherein the first side surface extending in the second direction defines a first virtual side surface, the second side surface extending in the first direction defines a second virtual side surface, and a meeting of the first virtual side surface and the second virtual side surface defines virtual corners,
wherein any one of the virtual corners is spaced by a first distance away from any other of the virtual corners disposed in the second direction, by a second distance away from any other of the virtual corners disposed in the first direction,
wherein each of the first corners is spaced by a first gap away from the one of the virtual corners in the second direction,
wherein the second corner is spaced by a second gap away from the one of the virtual corners in the first direction, and
wherein at least one of a ratio of the first gap to the first distance and a ratio of the second gap to the second distance ranges from 0.1 to 0.5.

15. The camera module of claim 14, wherein a distance between the first corners in the first side surfaces is defined as a first length, and in the first side surfaces, a ratio of the first length to the first distance ranges from 0 to 0.8.

16. The camera module of claim 14, wherein a distance between the second corners in the second side surfaces is defined as a second length, and in the second side surfaces, a ratio of the second length to the second distance ranges from 0 to 0.8.

17. The camera module of claim 14,
wherein the first portion includes a first protrusion inserted into a first hole defined in the first camera housing and protruding toward the first rotation shaft, and
wherein the second portion includes a second protrusion inserted into a second hole defined in the second camera housing, and protruding toward the second rotation shaft.

18. A portable communication device, comprising:
a camera assembly including a lens and an image sensor;
a first camera housing and a second camera housing in which at least a portion of the camera assembly is disposed;

a connection member disposed between the first camera housing and the second camera housing, in which the camera assembly is rotatably coupled to the second camera housing, wherein the connection member includes a first portion rotatably coupled to the camera assembly and a second portion rotatably coupled to the second camera housing;

a printed circuit board (PCB) surrounding at least a portion of the camera assembly;

a plurality of coils electrically connected to the PCB, wherein the plurality of coils includes a first coil disposed on a first area of the PCB, a second coil disposed on a second area of the PCB, and a third coil disposed on a third area of the PCB; and a plurality of magnetic bodies that electromagnetically interacts with the plurality of coils, including a first magnetic body disposed inside the camera assembly and facing the first area, a second magnetic body defining an inner surface of the camera housing and facing the second area, and a third magnetic body defining the inner surface of the camera housing and facing the third area, wherein the camera assembly includes a fourth side area substantially facing the second magnetic body, a third side area facing the fourth side area, a second side area substantially facing the third magnetic body, a first side area facing the second side area, a first corner area formed between the first side area and the second side area, and a second corner area formed between the first side area and the fourth side area, wherein a first virtual side surface is defined extending from the first side area, and a second virtual side surface is defined extending from the third side area, in which a crossing of the first virtual side surface and the second virtual side surface forms a first virtual corner, and a second virtual corner is defined by crossing the first virtual side surface extending from the first side area with a virtual area extending from the fourth side area, wherein the first side area defines a first corner together with the first corner area, wherein the first side area defines a second corner together with the second corner area, wherein the first virtual corner and the second virtual corner are spaced by a first distance away from each other, wherein the first virtual corner and the first corner are spaced by a first gap away from each other, wherein the second virtual corner and the second corner are spaced by a second gap away from each other, and wherein at least one of a first ratio of the first gap to the first distance and a second ratio of the second gap to the first distance ranges from 0.1 to 0.5.

19. The portable communication device of claim 18, further comprising a control circuit electrically connected to the PCB, the first coil, the second coil, and the third coil, wherein the control circuit is configured to:

execute a first function including moving the camera assembly using the first coil in a direction substantially parallel to an optical axis of the lens, and execute a second function including rotating the camera assembly about at least one rotation shaft which is substantially perpendicular to the optical axis of the lens, using at least one of the second coil or the third coil, wherein the first function includes an auto focusing function, and the second function includes an image stabilization function.

* * * * *

UNITED STATES PATENT AND TRADEMARK OFFICE
CERTIFICATE OF CORRECTION

PATENT NO. : 11,609,405 B2
APPLICATION NO. : 17/144224
DATED : March 21, 2023
INVENTOR(S) : Hyungjin Rho et al.

Page 1 of 1

It is certified that error appears in the above-identified patent and that said Letters Patent is hereby corrected as shown below:

In the Claims

Column 45, Claim 1, Lines 20 and 21 should read as follows:
--...is variable,
wherein the at least one side area...--

Signed and Sealed this
Eighteenth Day of April, 2023

Katherine Kelly Vidal
*Director of the United States Patent and Trademark Office*